United States Patent
Ling et al.

(10) Patent No.: US 12,186,737 B2
(45) Date of Patent: *Jan. 7, 2025

(54) REGENERATION OF POLYMERIC CYCLODEXTRIN ADSORBENTS

(71) Applicant: CycloPure, Inc., Chicago, IL (US)

(72) Inventors: Yuhan Ling, Glenview, IL (US); Gokhan Barin, Wilmette, IL (US); Olivia Therese Teodoro, Chicago, IL (US); Ri Wang, Chicago, IL (US)

(73) Assignee: CycloPure, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,990

(22) Filed: Apr. 26, 2024

(65) Prior Publication Data

US 2024/0293801 A1    Sep. 5, 2024

Related U.S. Application Data

(63) Continuation of application No. 18/410,056, filed on Jan. 11, 2024.

(60) Provisional application No. 63/479,611, filed on Jan. 12, 2023.

(51) Int. Cl.
| | |
|---|---|
| *B01J 20/34* | (2006.01) |
| *B01J 20/26* | (2006.01) |
| *B01J 20/30* | (2006.01) |
| *B01J 39/18* | (2017.01) |
| *B01J 49/53* | (2017.01) |

(52) U.S. Cl.
CPC ......... *B01J 20/3475* (2013.01); *B01J 20/267* (2013.01); *B01J 20/3085* (2013.01); *B01J 20/3425* (2013.01); *B01J 39/18* (2013.01); *B01J 49/53* (2017.01)

(58) Field of Classification Search
CPC .. B01J 20/3475; B01J 20/267; B01J 20/3085; B01J 20/3425; B01J 49/53; B01J 39/18
See application file for complete search history.

(56) References Cited

U.S. PATENT DOCUMENTS

| | | | |
|---|---|---|---|
| 3,426,011 A | 2/1969 | Parmerter et al. | |
| 3,453,257 A | 7/1969 | Parmerter et al. | |
| 3,453,258 A | 7/1969 | Parmerter et al. | |
| 3,453,259 A | 7/1969 | Parmerter et al. | |

(Continued)

FOREIGN PATENT DOCUMENTS

| | | |
|---|---|---|
| CN | 1352199 A | 6/2002 |
| CN | 1658888 A | 8/2005 |

(Continued)

OTHER PUBLICATIONS

Deng, Shubo, et al. "Enhanced adsorption of perfluorooctane sulfonate and perfluorooctanoate by bamboo-derived granular activated carbon." Journal of hazardous materials 282 (2015): 150-157.*

(Continued)

*Primary Examiner* — Richard M Rump
(74) *Attorney, Agent, or Firm* — Cooley LLP

(57) ABSTRACT

Methods for removing PFAS from cationic CDP adsorbents having adsorbed PFAS are provided. The method comprises contacting a volume of the cationic CDP adsorbent with a regeneration medium and separating the cationic CDP adsorbent from the regeneration medium.

20 Claims, 10 Drawing Sheets

(56) References Cited

U.S. PATENT DOCUMENTS

| | | | |
|---|---|---|---|
| 3,453,260 | A | 7/1969 | Parmerter et al. |
| 3,459,731 | A | 8/1969 | Gramera et al. |
| 3,553,191 | A | 1/1971 | Parmerter et al. |
| 3,565,887 | A | 2/1971 | Parmerter et al. |
| 4,535,152 | A | 8/1985 | Szejtli et al. |
| 4,565,727 | A | 1/1986 | Giglia et al. |
| 4,616,008 | A | 10/1986 | Hirai et al. |
| 4,638,058 | A | 1/1987 | Brandt et al. |
| 4,678,598 | A | 7/1987 | Ogino et al. |
| 4,746,734 | A | 5/1988 | Tsuchiyama et al. |
| 5,183,809 | A | 2/1993 | Weisz et al. |
| 5,262,404 | A | 11/1993 | Weisz et al. |
| 5,488,021 | A | 1/1996 | DeLiso et al. |
| 5,496,649 | A | 3/1996 | Mallory et al. |
| 6,444,723 | B1 | 9/2002 | Kline |
| 6,881,712 | B2 | 4/2005 | Angell et al. |
| 9,828,458 | B2 | 11/2017 | Suri et al. |
| 10,287,185 | B2 | 5/2019 | Nickelsen et al. |
| 11,001,645 | B2 | 5/2021 | Barin et al. |
| 11,155,646 | B2 | 10/2021 | Barin et al. |
| 11,512,146 | B2 | 11/2022 | Barin et al. |
| 2001/0008222 | A1 | 7/2001 | Ma et al. |
| 2005/0154198 | A1 | 7/2005 | Trotta et al. |
| 2005/0262646 | A1 | 12/2005 | Berlinger |
| 2006/0067965 | A1 | 3/2006 | Chandra et al. |
| 2010/0311905 | A1 | 12/2010 | Mentink et al. |
| 2014/0178457 | A1 | 6/2014 | Travaglini et al. |
| 2015/0004389 | A1 | 1/2015 | Corinti et al. |
| 2015/0273389 | A1 | 10/2015 | Liu et al. |
| 2015/0361595 | A1 | 12/2015 | Keane et al. |
| 2016/0304630 | A1 | 10/2016 | Dichtel et al. |
| 2016/0370357 | A1 | 12/2016 | Lucas et al. |
| 2017/0173560 | A1 | 6/2017 | Dichtel et al. |
| 2017/0222458 | A1 | 8/2017 | Chang et al. |
| 2018/0186939 | A1 | 7/2018 | Blanchemain et al. |
| 2019/0015814 | A1 | 1/2019 | Trabolsi et al. |
| 2019/0375858 | A1 | 12/2019 | Xie et al. |
| 2020/0071530 | A1 | 3/2020 | Birkeland |
| 2020/0262936 | A1 | 8/2020 | Barin et al. |
| 2020/0306726 | A1 | 10/2020 | James et al. |
| 2020/0398252 | A1 | 12/2020 | Ma et al. |
| 2021/0163631 | A1 | 6/2021 | Barin et al. |
| 2022/0017645 | A1 | 1/2022 | Barin et al. |
| 2023/0279158 | A1 | 9/2023 | Barin et al. |
| 2024/0238761 | A1 | 7/2024 | Ling et al. |

FOREIGN PATENT DOCUMENTS

| | | |
|---|---|---|
| CN | 101733009 A | 6/2010 |
| CN | 102659206 A | 9/2012 |
| CN | 107376875 A | 11/2017 |
| CN | 107709251 A | 2/2018 |
| CN | 107709441 A | 2/2018 |
| CN | 108554387 A | 9/2018 |
| CN | 108579689 A | 9/2018 |
| CN | 109046280 A | 12/2018 |
| CN | 109053932 A | 12/2018 |
| JP | 2005125193 A | 5/2005 |
| JP | 2006083379 A | 3/2006 |
| JP | 2010119389 A | 6/2010 |
| JP | 2013233473 A | 11/2013 |
| JP | 2019218535 A | 12/2019 |
| KR | 20100122880 A | 11/2010 |
| WO | WO-2012090018 A1 | 7/2012 |
| WO | WO-2016172118 A1 | 10/2016 |
| WO | WO-2018200857 A1 | 11/2018 |
| WO | WO-2020073674 A1 | 4/2020 |
| WO | WO-2020167375 A1 | 8/2020 |
| WO | WO-2022018472 A1 | 1/2022 |

OTHER PUBLICATIONS

Ling, Yuhan, et al. "Novel Cyclodextrin Polymer Adsorbents for PFAS Removal." Forever Chemicals. CRC Press, 2021. 291-313.*

Helbling, Damian, and William R. Dichtel. "Rational Design and Implementation of Novel Polymer Adsorbents for Selective Uptake of PFAS from Groundwater." (2022): 120.*

Vakili, Mohammadtaghi, et al. "Regeneration of chitosan-based adsorbents used in heavy metal adsorption: A review." Separation and Purification Technology 224 (2019): 373-387.*

Boyer, Treavor H., et al. "Life cycle environmental impacts of regeneration options for anion exchange resin remediation of PFAS impacted water." Water research 207 (2021): 117798.*

Lin, Wei. Dynamic modeling of the biological activated carbon (BAC) process and its experimental corroboration. State University of New York at Buffalo, 1992.*

Klemes, Max. Understanding and Designing Cyclodextrin Adsorbents for Water Purification. Diss. Northwestern University, 2020.*

Trang, Brittany. Methods and Mechanisms for Per-and Polyfluoroalkyl Substance (PFAS) Removal and Degradation. Diss. Northwestern University, 2022.*

Alsbaiee et al., Rapid removal of organic micropollutants from water by a porous beta-cyclodextrin polymer; Nature vol. 529, pp. 190-194. Dec. 21, 2015.

Alzate-Sanchez et al. "Cotton Fabric Functionalized with a—Cyclodextrin Polymer Captures Organic Pollutants from Contaminated Air and Water," Chem. Mater. 2016, 28, 8340-8346.

Anne, J.M., et al., "β-Cyclodextrin Conjugated Bifunctional Isocyanate Linker Polymer for Enhanced Removal of 2,4-Dinitrophenol from Environmental Waters," Royal Society Open Science, 2018, vol. 5, 180942, 22 pages.

Barry et al., "Perfluorooctanoic Acid (PFOA) Exposures and Incident Cancers Among Adults Living Near a Chemical Plant," Environ. Health Perspect. 2013, 121(11-12):1313-1318.

Barzen-Hanson et al., "Discovery of 40 Classes of Per-And Polyfluoroalkyl Substances in Historical Aqueous Film-Forming Foams (AFFFs) and AFFF-Impacted Groundwater," Environ. Sci. Technol. 2017, 51, 2047-2057.

Berto S., et al., "Synthesis of new iconic β-cyclodextrin polymers and characterization of their heavy metals retentions," Journal of Inclusion Phenomena and Macrocyclic Chemistry, 2007, vol. 57, pp. 631-636.

Carpenter et al., "Widespread Micropollutant Monitoring in the Hudson River Estuary Reveals Spatiotemporal Micropollutant Clusters and Their Sources," Environ. Sci. Technol. 2018, 52, 6187-6196.

Co-pending U.S. Appl. No. 18/410,056, inventors Ling; Yuhan et al., filed on Jan. 11, 2024.

D'Agostino et al., "Certain Perfluoroalkyl and Polyfluoroalkyl Substances Associated With Aqueous Film Forming Foam Are Widespread in Canadian Surface Waters," Environ. Sci. Technol. 2017, 51, 13603-13613.

Deng et al., "Removal of perfluorooctane sulfonate from wastewater by anion exchange resins: effects of resin properties and solution chemistry," Water Research 44:5188-5195 (Oct. 2010).

Diamanti-Kandarakis et al., "Endocrine-Disrupting Chemicals: an Endocrine Society Scientific Statement," Endocr. Rev. 2009, 30, 293-342.

Diedaini-Pilard and Perly, "Optimal Performances with Minimal Chemical Modification of Cyclodextrins," The 7th International Cyclodextrin Symposium Abstracts, p. 49 (Apr. 1994).

Du et al., "Adsorption behavior and mechanism of perfluorinated compounds on various adsorbents—a review," Journal of Hazardous Materials 274:443-454 (Jun. 2014).

Fan D., et al., "Research on β-Cyclodextrin Cross-Linked Polymers Removing Chlorobenzene and Nitrobenzene in Micro-Polluted Water", Environmental Science & Technology, Dec. 15, 2010, pp. 258-260.

Folch-Cano, C et al., "Inclusion and Functionalization of Polymers with Cyclodextrins: Current Applications and Future Prospects," Molecules 19:14066-14079 (2014).

Gallo et al., "Serum Perfluorooctanoate (PFOA) and Perfluorooctane Sulfonate (PFOS) Concentrations and Liver Function Biomarkers in a Population With Elevated PFOA Exposure," Environ. Health Perspect. 2012, 120, 655-660.

Hishiya, T., et al., "Molecularly Imprinted Cyclodextrin Polymers as Stationary Phases of HighPerformance Liquid Chromatography," Polymer Journal, 2003, vol. 35, No. 5, pp. 440-445.

(56) References Cited

OTHER PUBLICATIONS

Hu et al., "Detection of Poly-and Perfluoroalkyl Substances (PFASs) in U.S. Drinking Water Linked to Industrial Sites, Military Fire Training Areas, and Wastewater Treatment Plants," Environ. Sci. Technol. Lett. 2016, 3, 344-350.

International Search Report and Written Opinion for PCT Application No. PCT/US2024/011236 dated Apr. 17, 2024, 10 pages.

International Search Report and Written Opinion issued by the International Searching Authority for Application No. PCT/US2020/018149, dated Apr. 20, 2020, 10 pages.

Ji et al., "Removal of GenX and Perfluorinated Alkyl Substances from Water by Amine-Functionalized Covalent Organic Frameworks," Am. Chem. Soc. 2018, 140, 12677-12681.

Kawano, S., et al., "Adsorption Capability of Urethane-Crosslinked Heptakis (2,6-di-O-methyl)-β-Cyclodextrin Polymers Toward Polychlorobiphenyls in Nonpolar Organic Media," Polymer Journal, 2015, vol. 47, pp. 443-448.

Kleme et al., "Phenolation of cyclodextrin polymers controls their lead and organic micropollutant adsorption," Chem. Sci. 2018, 9, 8883-8889.

Li et al., "Phenolation of cyclodextrin polymers controls their lead and organic micropollutant adsorption," J. Chromatogr. A 2018, 1541, 52-56.

Ling et al., "Benchmarking Micropollutant Removal by Activated Carbon and Porous—Cyclodextrin Polymers Under Environmentally Relevant Scenarios," Environ. Sci. Technol. 2017, 51, 7590-7598.

Mason et al., "Enhancement of CO2 Affinity in a Polymer of Intrinsic Microporosity by Amine Modification," Macromolecules 2014, 47:1021-1029.

Melzer et al., "Association Between Serum Perfluorooctanoic Acid (PFOA) and Thyroid Disease in the U.S. National Health and Nutrition Examination Survey," Environ. Health Perspect. 2010, 118, 686-692.

Raoov et al., "Synthesis and Characterization of ß-Cyclodextrin Functionalized Ionic Liquid Polymer as a Macroporous Material for the Removal of Phenols and As(V)," Int. J. Mol. Sci. 15(1):100-119 (2014).

Research on Rural Water Environment Ecological Management Model, First Edition, Liangping Deng et al., pp. 77-78, Yellow River Water Conservation Press.

Richardson et al., "Water Analysis: Emerging Contaminants and Current Issues," Anal. Chem. 2018, 90, 398-428.

Sun et al., "Legacy and Emerging Perfluoroalkyl Substances are Important Drinking Water Contaminants in the Cape Fear River Watershed of North Carolina," Environ. Sci. Technol. Lett. 2016, 3, 415-419.

Tetreault et al., "Intersex and Reproductive Impairment of Wild Fish Exposed to Multiple Municipal Wastewater Discharges," Toxicol. 2011, 104, 278-290.

Xiao et al., "Cross-linker Chemistry Determines the Uptake Potential of Perfluorinated Alkyl Substances by -Cyclodextrin Polymers," Macromolecules 52(10):3747-3752 (2019).

Xiao et al., "Cyclodextrin Polymer Network Sequesters Perfluorooctanoic Acid at Environmentally Relevant Concentrations," Am. Chem. Soc. 139:7689-7692 (2017).

Yang, S.Y., et al., "Synthesis and Characterization of Cationic and Anionic Cyclodextrin Oligomaers and Their Use in Layer-by-Layer Film Formation," Bulletin of the Korean Chemical Society 34:2016-2022 (2013).

Gobindlal et al., "Solvent-Free, Ambient Temperature and Pressure Destruction of Perfluorosulfonic Acids under Mechanochemical Conditions: Degradation Intermediates and Fluorine Fate," Environ Sci Technol. 57(1):277-285. (Jan. 10, 2023). Epub Dec. 28, 2022.

Kah et al., "Sequestration and potential release of PFAS from spent engineered sorbents," Sci Total Environ. 765:142770, pp. 1-10. (Apr. 15, 2021). Epub Oct. 7, 2020.

\* cited by examiner

REGENERATION OF POLYMERIC CYCLODEXTRIN ADSORBENTS

CROSS-REFERENCE TO RELATED APPLICATION

This application is a continuation of U.S. patent application Ser. No. 18/410,056, filed on Jan. 11, 2024, which claims the benefit of priority to U.S. Provisional Application No. 63/479,611, filed on Jan. 12, 2023, which is hereby incorporated by reference in its entirety.

BACKGROUND

A new class of aryl crosslinked cyclodextrin polymers (CDPs) have been identified which exhibit rapid adsorption characteristics for poly-and per-fluoroalkyl substances (PFAS), such as those described in U.S. Pat. Nos. 9,624,314 and 11,155,646, the contents of each of which are hereby incorporated by reference for all purposes. In order to be commercially useful in treating PFAS contaminated waste streams, such CDP adsorbents must not only adsorb PFAS with rapid kinetics and high adsorption capacities, but they must also readily release PFAS under appropriate regeneration conditions with high levels of efficiency. That is, essentially all of the adsorbed PFAS should be removed from the CDP adsorbent during regeneration, restoring, as nearly as possible, the original PFAS adsorption characteristics of the CDP adsorbent as well as enabling the isolation of PFAS waste for safe disposal. Typically, regeneration is accomplished using a regeneration medium that can overcome the adsorption mechanism(s) by which the PFAS binds to the CDP. Ideally, such a regeneration medium should be relatively non-toxic, and should regenerate the CDP adsorbent rapidly using a minimal volume of regeneration medium. However, appropriate regeneration media and regeneration conditions depend upon the specific properties of CDP and PFAS. The present invention, in various embodiments, provides particularly effective regeneration media and regeneration conditions which are commercially advantageous for regenerating CDP adsorbents comprising adsorbed PFAS.

SUMMARY

The present disclosure is directed to, inter alia, regeneration media and regeneration conditions suitable for removing adsorbed PFAS from CDP adsorbents, such as cationic CDP adsorbents of the present disclosure. In various embodiments, the present disclosure is directed to methods for concentrating adsorbed PFAS after removal from CDP adsorbents, for example cationic CDP adsorbents of the present disclosure. The concentrated PFAS provided by the methods of the present disclosure may be in solid or liquid form. In various embodiments, the cationic CDP adsorbents of the present disclosure, containing adsorbed PFAS, are contacted with a regeneration medium comprising about 0.5:1 (v/v) to about 10:0 (v/v) of alcohol:water (in some embodiments, ethanol:water, or pure ethanol), and optionally a salt selected from the group consisting of alkali or alkaline earth or ammonium ($NH_4^+$) chlorides, nitrates, sulfates, phosphates, formates, acetates, or hydroxides. In some embodiments, the regeneration medium is an ethanol solution containing 50% (v/v) ethanol:water, 95% (v/v) ethanol:water, or pure ethanol. In many embodiments, the CDP adsorbent (e.g., a cationic CDP adsorbent) is loaded into a packed-bed vessel. The regeneration process can be run in upflow, downflow, or batch mode as described herein. When the regeneration process is run in upflow mode, the flow can be linear or circular as described herein, and the flow rate can be characterized by the bed expansion rate, which can be in the range of about 5% to about 100%. When the regeneration process is run in a downflow mode, the empty bed contact time is in the range of about 1 minute to about 120 minutes. When the regeneration process is run in batch mode, the contact time of the regeneration medium with the CDP adsorbent (e.g., a cationic CDP adsorbent) can be in the range of about 10 minutes to about 24 hours. After said contacting, the regeneration medium and cationic CDP adsorbent are separated, thereby transferring at least about 50% of the adsorbed PFAS into the regeneration medium. The PFAS containing regeneration medium can then be further processed, e.g., by optionally further concentrating the PFAS, and ultimately subjecting the PFAS to a suitable PFAS destruction process, or alternatively to disposal.

DETAILED DESCRIPTION

Figure 1:
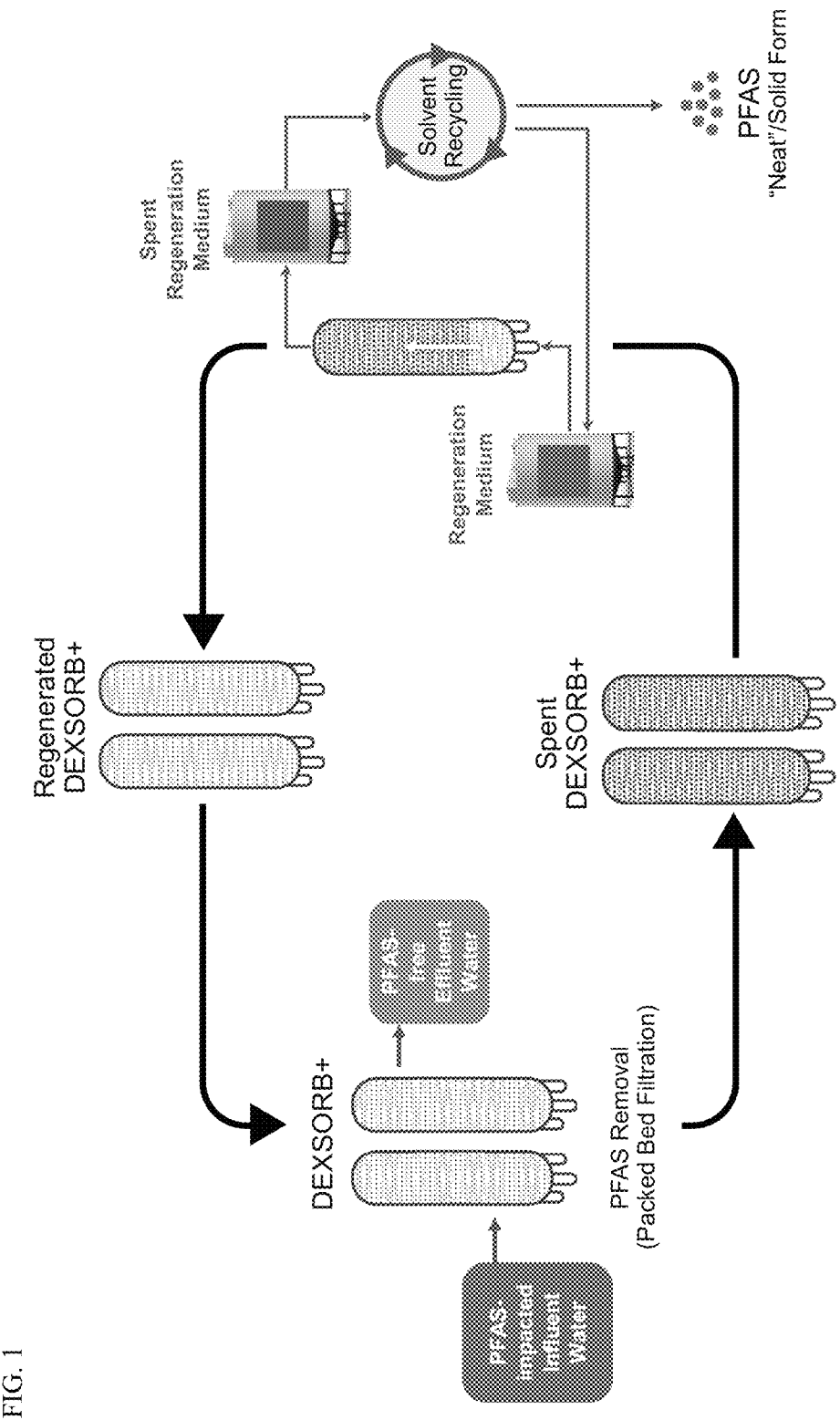
FIG. 1: Schematic of one embodiment of a regeneration process for DEXSORB+generating a PFAS-laden solid waste.

It is known in the art that adsorption mechanisms for the removal or separation of various adsorbates from specific matrices differ based on the specific chemical characteristics of the adsorbent and the adsorbate. These adsorption mechanisms rely on interactions including, but not limited to, hydrophobic interactions, van der Waals forces, pi-pi stacking, hydrogen bonding, electrostatic interactions, ion exchange, etc., between the adsorbent and the adsorbate. These interactions can be further influenced by the characteristics of the matrix comprising the adsorbate (e.g., other components dissolved or dispersed in an aqueous solution of PFAS) due to competitive adsorption. For example, Deng et al. (Water Research 2010, 44, 5188-5195) found that dissolved anions, such as sulfate and anionic hexavalent chromium complexes, interfered with the adsorption of perfluorooctanesulfonic acid (PFOS) onto anion exchange resins.

These underlying adsorption mechanisms ultimately govern the strength of the adsorbate-adsorbent interactions, which in turn determine the case and effectiveness of desorption process, i.e., recovery of the adsorbate and regeneration of the spent adsorbent. Another key factor for effective desorption is the solubility of adsorbate in the regeneration medium.

Thus, appropriate regeneration conditions depend on the specific chemical characteristics of the adsorbent and adsorbate(s), which affect the adsorption mechanisms specific to a particular adsorbent and adsorbate(s). Further, regeneration efficiency is impacted by the solubility properties of the adsorbate in the regeneration medium. Thus, the parameters controlling the efficiency of regeneration cannot be readily extrapolated from regeneration conditions found to be useful for other adsorbents and adsorbates. For example, Deng et al. found that two structurally quite similar acrylic anion exchange resins containing adsorbed PFOS, IRA958 and IRA67, nevertheless exhibited quite distinct regeneration characteristics with the same regeneration medium.

The regeneration of adsorbents for PFAS is complicated by the fact that PFAS is a category of poly- and perfluoroalkylated compounds encompassing a wide variety of different chemical and structural features, including varying alkyl chain lengths, linear and branched structures, and different head group chemistries. Because each of these chemical and structural features impacts the strength of adsorption, regeneration of an adsorbent containing adsorbed PFAS requires carefully tailored regeneration conditions.

The efficiency of PFAS desorption (i.e., recovery efficiency) from an adsorbent is critical to the design and ultimate cost of removing PFAS from a fluid stream (e.g., PFAS contaminated water). Higher recovery efficiency of PFAS after regeneration reduces the amount of residual PFAS remaining on the adsorbent, and hence enables its reuse with higher PFAS adsorption capacity for the regenerated adsorbent. Higher regeneration efficiency is very important, as higher PFAS recovery efficiency allows more reuse cycles for a given batch of adsorbent before replacement with fresh adsorbent is required. Higher recovery efficiency also minimizes the volume of regeneration medium required per regeneration cycle, which provides for higher concentrations of PFAS in the spent regeneration medium. Such higher PFAS concentrations minimize the cost of subsequent processing, including the cost and difficulty of recycling regeneration medium, the size and selection of unit operations for handling PFAS containing regeneration medium (e.g., separation and/or concentration of regeneration medium from PFAS by means of membrane or distillation processes), and the ultimate cost of disposing or destroying the isolated PFAS obtained from regeneration.

CDP adsorbents, as described herein, are particularly effective at removing PFAS from e.g., aqueous mixtures. CDP adsorbents are regenerable by the use of regeneration media which are able to readily disturb the host-guest complex between cyclodextrin and adsorbate e.g., PFAS. DEXSORB+, a class of cationic CDP adsorbents described in U.S. Pat. No. 11,001,645 (the content of which is hereby incorporated by reference for all purposes), has been demonstrated as capable of effectively removing PFAS from water. However, desorption of PFAS from cyclodextrin-based adsorbents has not been explored extensively. Methanol and ethanol, and aqueous methanol or ethanol solutions have been suggested as suitable regeneration media (e.g., U.S. Pat. No. 9,624,314), and methanol has been demonstrated for desorbing bisphenol A (BPA) from spent cyclodextrin-based adsorbents (Alsbaiee et al., Nature 2016, 529, 190-194). However, the CDPs used in these references were not cationic. Further, these references did not take into consideration, nor describe, complete PFAS desorption from spent adsorbent to allow safe reuse of regenerated adsorbent. In addition, these workers did not consider whether the selected regeneration medium was safe, or the efficiency of regeneration (e.g., complete regeneration with minimum amount of regeneration medium as possible for practical and cost-effective handling of spent regeneration medium containing PFAS waste).

Other researchers (Du et al., Journal of Hazardous Materials 2014, 274, 443-454; Nickelsen and Woodard, U.S. Pat. No. 10,287,185; James et al., US 2020/0306726) have studied regeneration medium efficiency with respect to removal of specific PFAS compounds (PFOS; perfluorooctanoic acid, PFOA) from various, non-cyclodextrin-based adsorbents (activated carbon, anion-exchange resins, silicas, zeolites, montmorillonite clays, hydrotalcite, chitosan, etc.), and found that regeneration efficiencies varied significantly depending on the adsorbent chemistry and regeneration medium used. Thus, identifying a suitable regeneration medium and regeneration conditions requires careful consideration of multiple factors: inter alia, the chemical composition of the adsorbent (e.g., DEXSORB+ and similar cationic cyclodextrin-based adsorbents described herein), the chemical composition of the adsorbate(s) (e.g., PFAS), the kinetics and completeness of desorption of the adsorbate(s) during regeneration, the safety (toxicity, flammability, etc.) of the regeneration medium, and the suitability of the regeneration medium for further processes to isolate the adsorbate(s). Notably, none of Du et al., Nickelsen and Woodard, or James et al. evaluated the regeneration of PFAS from CDP adsorbents or cationic CDP adsorbents.

The CDP adsorbents of the present invention are, in particular embodiments, cationic, aryl crosslinked CDPs as described in U.S. Pat. No. 11,155,646, the content of which is hereby incorporated by reference for all purposes. In specific embodiments, the cationic CDPs of the present disclosure comprise β-cyclodextrin crosslinked with tetrafluoroterephthalonitrile (TFN), further modified by reaction with a cationic group (e.g., choline chloride); β-cyclodextrin crosslinked with an isocyanate (e.g., toluene diisocyanate (TDI), including 2,4-toluene diisocyanate, 2,6- toluene diisocyanate, and mixtures thereof, and/or one or more other polyisocyanates such as methylene diphenyl diisocyanate (MDI), 2,4'-diphenylmethane diisocyanate, 4,4'-diphenylmethane diisocyanate, polymeric MDI, and mixtures thereof); or β-cyclodextrin crosslinked with an activated form of a carboxylic acid such as an acid chloride or ester (e.g., terephthaloyl chloride or dimethyl terephthalate), optionally modified with a cationic group, such as an ammonium group or a tetraalkyl ammonium group. The specific CDP adsorbents described herein are not limited to polymers prepared from the specific cyclodextrins and aryl crosslinking monomers described above. That is, any of the cyclodextrins described in U.S. Pat. No. 11,155,646, including α-cyclodextrins, β-cyclodextrins, or γ-cyclodextrins, or synthetic cyclodextrins having 3-20 glucose units, including 3, 4, 5, 6, 7, 8, 9, 10, 11, 12, 13, 14, 15, 16, 17, 18, 19, and 20 glucose units, inclusive of all ranges therebetween, can be used to prepare the cationic CDP adsorbents of the present disclosure.

Suitable crosslinking groups are aromatic (or heteroaromatic) compounds having two or more functional groups capable of reacting with the hydroxyl groups of the cyclodextrin, for example, aryl fluorides, isocyanates, carboxylic acids (or any activated forms of carboxylic acids, such as acid halides (including acid chlorides) or esters). TFN is a specific embodiment of suitable aryl fluorides; TDI, MDI, and polymeric MDI are specific embodiments of suitable isocyanates; and terephthaloyl chloride is a specific embodiment of suitable activated acid chlorides. Other suitable monomers may also be incorporated into the CDP adsorbents of the present invention in order to modify the adsorption properties of the resulting CDPs. In particular embodiments, the CDPs of the present disclosure are modified with compounds bearing cationic functional groups, or functional groups capable of conversion to cationic groups. For example, β-cyclodextrin can be polymerized in the presence of TFN, a base (e.g., $K_2CO_3$) and choline chloride to provide a crosslinked polymer comprising aryl crosslinks bearing ethyl trimethylammonium groups (DEXSORB+TFN). In another example, β-cyclodextrin can be polymerized in the presence of a diisocyanate (e.g., TDI and/or MDI) and choline chloride to provide a crosslinked polymer comprising aryl crosslinks bearing ethyl trimethylammonium groups (DEXSORB+TDI or DEXSORB+MDI). In other embodiments, the CDP itself can be treated post-synthetically so as to incorporate cationic groups. For example, when β-cyclodextrin is reacted with a diisocyanate (e.g., TDI and/or MDI), under appropriate conditions some of the isocyanate groups can hydrolyze to form carbamic acids, which can decompose to amines. The resulting amine groups can be quaternized to form cationic ammonium groups on the polymer.

The CDP adsorbents described herein are useful for adsorbing PFAS from various mixtures, including water streams (groundwater, drinking water, wastewater, etc.) contaminated with PFAS. PFAS can comprise a variety of poly-and per-fluorinated compounds, including perfluorobutanoic acid (PFBA), perfluoropentanoic acid (PFPeA), perfluorohexanoic acid (PFHxA), perfluoroheptanoic acid (PFHpA), perfluorooctanoic acid (PFOA), perfluorononanoic acid (PFNA), perfluorodecanoic acid (PFDA), perfluoroundecanoic acid (PFUnA), perfluorododecanoic acid (PFDoA), perfluorotridecanoic acid (PFTrDA), perfluorotetradecanoic acid (PFTeA), perfluoropropane sulfonic acid (PFPrS), perfluorobutane sulfonic acid (PFBS), perfluoropentane sulfonic acid (PFPeS), perfluorohexane sulfonic acid (PFHxS), perfluoroheptane sulfonic acid (PFHpS), perfluorooctane sulfonic acid (PFOS), perfluorononane sulfonic acid (PFNS), perfluorodecane sulfonic acid (PFDS), perfluorododecane sulfonic acid (PFDOS), 4:2 fluorotelomer sulfonate (4:2FTS), 6:2 fluorotelomer sulfonate (6:2FTS), 8:2 fluorotelomer sulfonate (8:2FTS), 10:2 fluorotelomer sulfonate (10:2FTS), perfluorobutane sulfonamide (FBSA), N-methylperfluorobutanesulfonamide (MeFBSA), perfluorohexane sulfonamide (FHxSA), perfluorooctane sulfonamide (PFOSA), perfluorodecane sulfonamide (FDSA), N-ethylperfluorooctane-1-sulfonamide (NEtFOSA), N-methylperfluorooctane-1-sulfonamide (NMeFOSA), perfluorooctane sulfonamido acetic acid (FOSAA), N-ethyl perfluorooctane sulfonamido acetic acid (NEtFOSAA), N-methyl perfluorooctane sulfonamido acetic acid (NMeFOSAA), N-methyl perfluorooctanesulfonamidoethanol (NMcFOSE), N-ethyl perfluorooctanesulfonamidoethanol (NEtFOSE), hexafluoropropylene oxide dimer acid (HFPO-DA), 4,8-dioxa-3H-perfluorononanoate (ADONA), perfluoro-3-methoxypropanoic acid (PFMPA), perfluoro-4-methoxybutanoic acid (PFMBA), perfluoro-3,6-dioxaheptanoic acid (NFDHA), 9-chlorohexadecafluoro-3-oxanone-1-sulfonic acid (9Cl-PF3ONS), 11-chlorocicosafluoro-3-oxanonane-1-sulfonic acid (11CL-PF3OUdS), perfluoro(2-ethoxyethane) sulfonic acid (PFEESA), perfluoro-4-ethylcyclohexane sulfonic acid (PFECHS), 8-chloroperfluoro-1-octanesulfonic acid (8Cl-PFOS), 3-perfluoropropyl propanoic acid (3:3FTCA), 2H,2H,3H,3H-perfluorooctanoic acid (5:3FTCA), 3-perfluoroheptyl propanoic acid (7:3FTCA), 2H-perfluoro-2-dodecenoic acid (FDUEA), 2H-perfluoro-2-decenoic acid (FOUEA), bis(perfluorohexyl)phosphinic acid (6:6PFPi), (heptadecafluorooctyl)(tridecafluorohexyl) phosphinic acid (6:8PFPi), bis(perfluorooctyl)phosphinic acid (8:8PFPi), N-(3-dimethylaminopropan-1-yl) perfluoro-1-hexanesulfonamide (N-AP-FHxSA), and combinations thereof.

Regeneration media useful for efficiently regenerating PFAS contaminated cationic CDP adsorbents of the present disclosure comprise alcohols, optionally aqueous alcohols. Suitable alcohols include methanol, ethanol, and propanols (e.g., isopropanol). Aqueous alcohol mixtures can have volumetric ratios of alcohol:water ranging from about 0.5:1 to about 10:0, for example about 0.5:1, about 0.6:1, about 0.7:1, about 0.8:1, about 0.9:1, about 1:1, about 1.5:1, about 2:1, about 2.5:1, about 3:1, about 3.5:1, about 4:1, about 4.5:1, about 5:1, about 5.5:1, about 6:1, about 6.5:1, about 7:1, about 7.5:1, about 8:1, about 8.5:1, about 9:1, or about 10:0, including any range between any of these ratios. In specific embodiments, the alcohol is ethanol. In other specific embodiments, the alcohol is methanol. In still other specific embodiments, the alcohol is propanol (e.g., isopropanol).

In other embodiments, the amount of alcohol in suitable regeneration media can be expressed as volume percentages (% (v/v)) of alcohol in water (when present). For example, suitable regeneration media can contain a volume percent alcohol of about 40% (v/v), about 45% (v/v), about 50% (v/v), about 55% (v/v), about 60% (v/v), about 65% (v/v), about 70% (v/v), about 75% (v/v), about 80% (v/v), about 85% (v/v), about 90% (v/v), about 95% (v/v), or about 100% (v/v), including any range between any of these values. In specific embodiments, the alcohol is ethanol. In other specific embodiments, the alcohol is methanol. In still other specific embodiments, the alcohol is propanol (e.g., isopropanol).

In some embodiments, it is useful to include a dissolved salt in the regeneration medium to improve the efficiency of removing adsorbed PFAS from the CDP adsorbents (e.g., DEXSORB+ or other cationic CDP adsorbents as disclosed herein) of the present disclosure. The salt content of the regeneration medium can range in concentration from about 0.1 g/L to about 50 g/L, including about 0.1 g/L, about 0.2 g/L, about 0.3 g/L, about 0.4 g/L, about 0.5 g/L, about 0.6 g/L, about 0.7 g/L, about 0.8 g/L, about 0.9 g/L, about 1 g/L, about 1.1 g/L, about 1.2 g/L, about 1.3 g/L, about 1.4 g/L, about 1.5 g/L, about 1.6 g/L, about 1.7 g/L, about 1.8 g/L, about 1.9 g/L, about 2 g/L, about 2.1 g/L, about 2.2 g/L, about 2.3 g/L, about 2.4 g/L, about 2.5 g/L, about 2.6 g/L, about 2.7 g/L, about 2.8 g/L, about 2.9 g/L, about 3 g/L, about 3.1 g/L, about 3.2 g/L, about 3.3 g/L, about 3.4 g/L, about 3.5 g/L, about 3.6 g/L, about 3.7 g/L, about 3.8 g/L, about 3.9 g/L, about 4 g/L, about 4.1 g/L, about 4.2 g/L, about 4.3 g/L, about 4.4 g/L, about 4.5 g/L, about 4.6 g/L, about 4.7 g/L, about 4.8 g/L, about 4.9 g/L, about 5 g/L, about 5.1 g/L, about 5.2 g/L, about 5.3 g/L, about 5.4 g/L, about 5.5 g/L, about 5.6 g/L, about 5.7 g/L, about 5.8 g/L, about 5.9 g/L, about 6 g/L, about 6.1 g/L, about 6.2 g/L, about 6.3 g/L, about 6.4 g/L, about 6.5 g/L, about 6.6 g/L, about 6.7 g/L, about 6.8 g/L, about 6.9 g/L, about 7 g/L, about 7.1 g/L, about 7.2 g/L, about 7.3 g/L, about 7.4 g/L, about 7.5 g/L, about 7.6 g/L, about 7.7 g/L, about 7.8 g/L, about 7.9 g/L, about 8 g/L, about 8.1 g/L, about 8.2 g/L, about 8.3 g/L, about 8.4 g/L, about 8.5 g/L, about 8.6 g/L, about 8.7 g/L, about 8.8 g/L, about 8.9 g/L, about 9 g/L, about 9.1 g/L, about 9.2 g/L, about 9.3 g/L, about 9.4 g/L, about 9.5 g/L, about 9.6 g/L, about 9.7 g/L, about 9.8 g/L, about 9.9 g/L, about 10 g/L, about 11 g/L, about 12 g/L, about 13 g/L, about 14 g/L, about 15 g/L, about 16 g/L, about 17 g/L, about 18 g/L, about 19 g/L, about 20 g/L, about 21 g/L, about 22 g/L, about 23 g/L, about 24 g/L, about 25 g/L, about 26 g/L, about 27 g/L, about 28 g/L, about 29 g/L, about 30 g/L, about 31 g/L, about 32 g/L, about 33 g/L, about 34 g/L, about 35 g/L, about 36 g/L, about 37 g/L, about 38 g/L, about 39 g/L, about 40 g/L, about 41 g/L, about 42 g/L, about 43 g/L, about 44 g/L, about 45 g/L, about 46 g/L, about 47 g/L, about 48 g/L, about 49 g/L, or about 50 g/L, inclusive of all ranges between any of these values. Alternatively, the amount of salt dissolved in the regeneration medium can be expressed as a weight percent (wt. %). Suitable weight percentages of any of the salts disclosed herein in the regeneration medium ranges from about 0.01 wt. % to about 6 wt. %, including about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, about 2 wt. %, about 2.1 wt. %, about 2.2 wt. %, about 2.3 wt. %, about 2.4 wt. %, about 2.5 wt. %, about 2.6 wt. %, about 2.7 wt. %, about 2.8 wt. %, about 2.9 wt. %, about 3 wt. %, about 3.1 wt. %, about 3.2 wt. %, about 3.3 wt. %, about 3.4 wt. %, about 3.5 wt. %, about 3.6 wt. %, about 3.7 wt. %, about 3.8 wt. %, about 3.9 wt. %, about 4 wt. %, about 4.1 wt. %, about 4.2 wt. %, about 4.3 wt. %, about 4.4 wt. %, about 4.5 wt. %, about 4.6 wt. %, about 4.7 wt. %, about 4.8 wt. %, about 4.9 wt. %, or about 5 wt. %, about 5.1 wt. %, about 5.2 wt. %, about 5.3 wt. %, about 5.4 wt. %, about 5.5 wt. %, about 5.6 wt. %, about 5.7 wt. %, about 5.8 wt. %, about 5.9 wt. %, or about 6 wt. %, including all ranges between any of these values. Salt-containing regeneration media, as described herein above, can include any of the previously described alcohol solutions containing a suitable salt, including aqueous alcohol solutions containing a suitable salt, and solutions comprising essentially only alcohol containing a suitable salt.

Suitable salts include alkali (e.g., $Li^+$, $Na^+$, $K^+$, or $Cs^+$) or alkaline earth metal or ammonium ($NH_4^+$) chlorides, nitrates, sulfates, phosphates, formates, acetates, hydroxides, or combinations thereof. In particular embodiments, the salt comprises sodium sulfate ($Na_2SO_4$), potassium sulfate ($K_2SO_4$) cesium sulfate ($Cs_2SO_4$), ammonium acetate ($NH_4OAc$), ammonium hydroxide ($NH_4OH$), ammonium formate ($NH_4HCO_2$), lithium chloride (LiCl), sodium chloride (NaCl), or potassium hydroxide (KOH). In a specific embodiment, the regeneration medium comprises 2:1 (v/v) ethanol:water, containing about 0.5 g/L of $K_2SO_4$.

In other specific embodiments, the regeneration medium comprises a mixture of ethanol and water (in any ratio as described herein) and further comprising LiCl. In particular embodiments, the regeneration medium comprises a mixture of ethanol and water (in any ratio as described herein) and further comprises LiCl at a concentration of about 4 g/L. In still other specific embodiments, the regeneration medium comprises a mixture of ethanol and water (in any ratio as described herein) and further comprising KOH. In particular embodiments, the regeneration medium comprises a mixture of ethanol and water (in any ratio as described herein) and further comprises KOH at a concentration of about 0.76 g/L. In yet other specific embodiments, the regeneration medium comprises ethanol substantially free of water. In particular embodiments, the regeneration medium comprises ethanol substantially free of water and substantially free of added salts. In yet other embodiments, the regeneration medium comprises 95% (v/v) ethanol (and 5% (v/v) water—i.e., the azeotropic composition of ethanol and water), optionally containing a salt as described herein. In yet other particular embodiments, any of the regeneration media described herein (e.g., ethanol:water or ethanol) further comprise about 0.65 g/L NaCl. In various embodiments as described herein, the ethanol:water (v/v) ratio ranges from about 2:1 to about 10:0.

Figure 2:
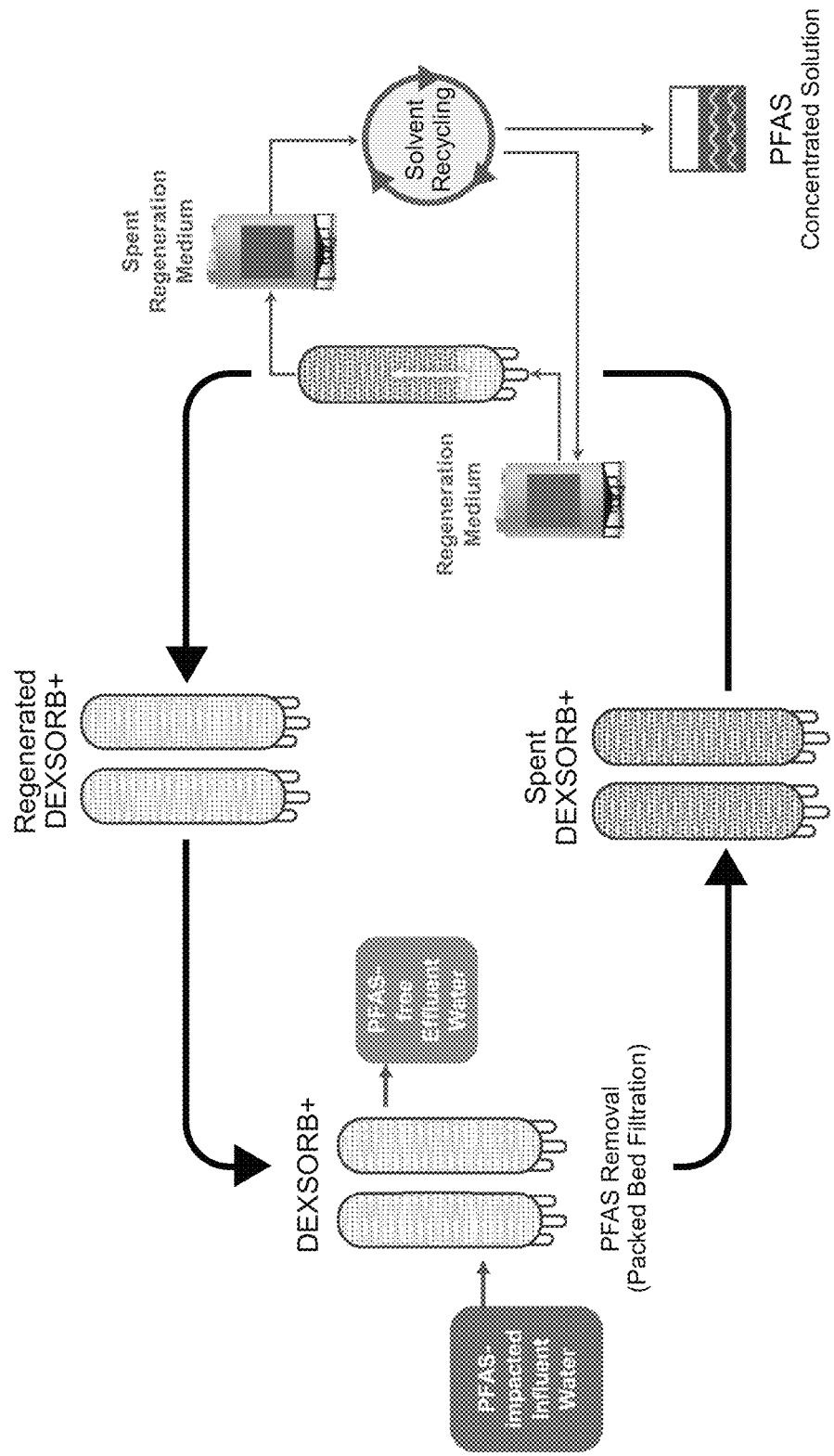
FIG. 2: Schematic of one embodiment of a regeneration process for DEXSORB+generating a concentrated liquid waste containing PFAS.
Figure 3A:
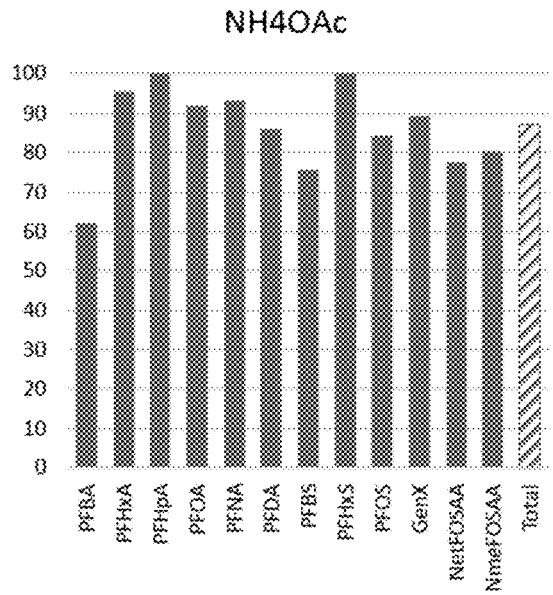
FIG. 3A: Regeneration efficiencies for various PFAS compounds, for DEXSORB+TFN regenerated with 1 mg/mL of $NH_4OAc$ dissolved in methanol.
Figure 3B:
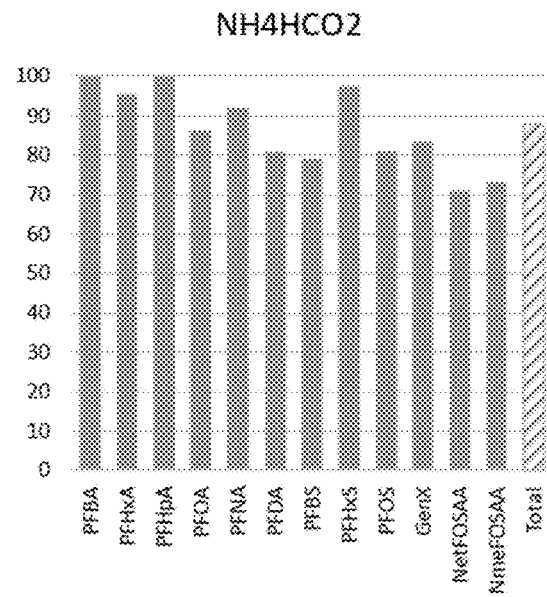
FIG. 3B: Regeneration efficiencies for various PFAS compounds, for DEXSORB+TFN regenerated with 1 mg/mL of $NH_4HCO_2$ dissolved in methanol.
Figure 3C:
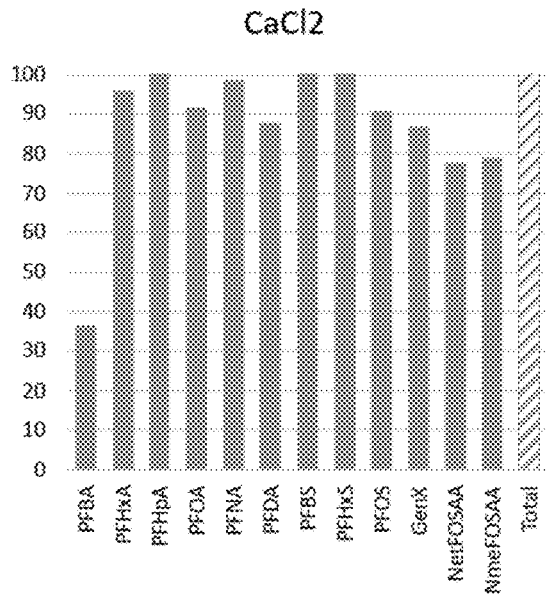
FIG. 3C: Regeneration efficiencies for various PFAS compounds, for DEXSORB+TFN regenerated with 1 mg/mL of $CaCl_2$ dissolved in methanol.
Figure 3D:
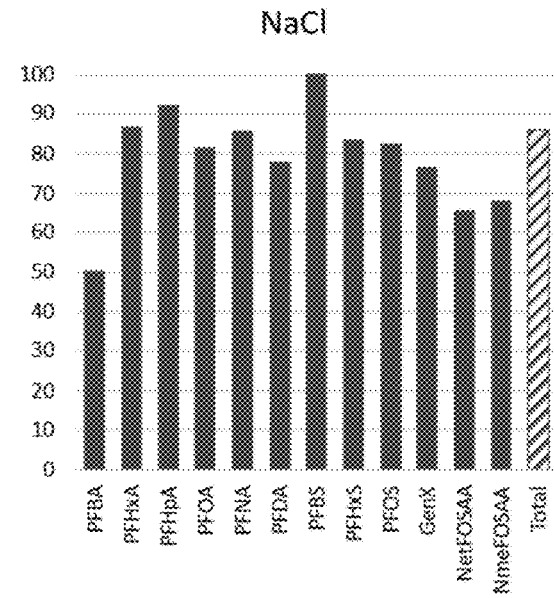
FIG. 3D: Regeneration efficiencies for various PFAS compounds, for DEXSORB+TFN regenerated with 1 mg/mL of NaCl dissolved in methanol.

The cationic CDP adsorbents described herein can be used to remove PFAS from aqueous liquids by contacting the cationic CDP adsorbents with the PFAS-contaminated aqueous liquid using equipment and methodologies known in the chemical and environmental engineering art. For example, the cationic CDP adsorbent (e.g., DEXSORB+) can be loaded into a packed-bed vessel equipped with at least one inlet and outlet whereby the PFAS-contaminated aqueous liquid can enter the packed-bed vessel, thereby contacting the cationic CDP adsorbent. The size of the packed-bed vessel, cationic CDP adsorbent loading, flow rate and residence time of the PFAS-containing liquid, and other relevant process parameters can be adjusted appropriately to allow removal of the PFAS from the liquid to acceptable levels. When the cationic CDP adsorbent becomes saturated with PFAS or adsorbs sufficient PFAS so as to reduce its effectiveness in removing PFAS from the PFAS-contaminated liquid, adsorbed PFAS must be removed from the cationic CDP adsorbent so that it can be reused (i.e., regenerated). Regeneration of a cationic CDP adsorbent containing adsorbed PFAS can be accomplished by contacting the cationic CDP adsorbent bed with a regeneration medium as described herein, using methods known in the art. This process is illustrated in FIG. 1 and FIG. 2.

In various embodiments, the operation temperature of the regeneration process can vary from ambient temperature (e.g., about 20° C.) to temperatures at which the regeneration medium remains below its boiling point, for example slightly below the boiling temperature of the alcohol or aqueous alcohol present in the regeneration medium. When the alcohol forms an azeotrope with, e.g., water, a person of skill in the art will recognize that the lowest boiling point may be lower than the boiling point of the alcohol. In addition, since the boiling point of the regeneration medium may vary depending upon atmospheric pressure and the amount of any dissolved salt that may be present, the highest suitable regeneration temperature at which the regeneration medium remains below its lowest boiling point may vary accordingly. In most embodiments, the regeneration process is carried out at temperatures ranging from about 10° C. to about 100° C., including about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C., including ranges between any of these values.

In some embodiments, the regeneration process can be run in an upflow mode where the flow of regeneration medium occurs from the bottom to the top of a packed-bed vessel. In alternative embodiments, the regeneration process can be run in a downflow mode where the flow of regeneration medium occurs from the top to the bottom of a packed-bed vessel. The flow can also be "linear", meaning the regeneration medium is passed only once through the CDP adsorbent containing adsorbed PFAS, or "circular", meaning that the regeneration medium is recirculated multiple times (2, 3, or more) through the CDP adsorbent containing adsorbed PFAS. In the "linear" flow setup, the regeneration medium passed through a vessel containing spent CDP adsorbent can be collected for concentration or directed to other vessel(s) containing spent CDP adsorbent and then collected for concentration. In the "circular" flow setup, the regeneration medium is recirculated multiple times through the same vessel containing spent CDP adsorbent and the regeneration medium is collected for concentration. This recirculation process can be repeated multiple rounds starting with fresh regeneration medium in each round.

When the process is run in a downflow mode, the flow rate of regeneration medium can be determined based on desired empty bed contact time (EBCT) which in various embodiments will be in the range of about 1-120 min for the regeneration process, including about 1 min, about 2 min, about 3 min, about 4 min, about 5 min, about 6 min, about 7 min, about 8 min, about 9 min, about 10 min, about 15 min, about 20 min, about 25 min, about 30 min, about 35 min, about 40 min, about 45 min, about 50 min, about 55 min, about 60 min, about 65 min, about 70 min, about 75 min, about 80 min, about 85 min, about 90 min, about 95 min, about 100 min, about 105 min, about 110 min, about 115 min, or about 120 min, including ranges between any of these values. EBCT refers to the amount of time required for the regeneration medium to travel through one empty bed volume. The term "empty bed volume" refers to the volume of the packed-bed vessel that is occupied by the cationic CDP adsorbent, i.e., the volume of the cationic CDP adsorbent.

When the process is run in an upflow mode, the flow rate can be determined based on desired bed expansion rate which in various embodiments will be in the range of about 5-100%, including about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, including ranges between any of these values. In specific embodiments, the bed expansion rate is in the range of about 30-50%. Proper adjustment of bed expansion rate is important to ensure that most of the particles are suspended during upflow and to minimize particle losses. The term "bed expansion rate" refers to the increase in bed length occupied by the CDP adsorbent in the vessel during upflow regeneration.

In general, sufficient regeneration medium should be used to permit complete or nearly complete removal of PFAS from the cationic CDP adsorbent. Efficient removal of PFAS from the cationic CDP adsorbent is highly advantageous for a number of reasons.

In other embodiments, the regeneration process may be carried out in a "batch" mode, in which the cationic CDP adsorbent containing adsorbed PFAS is mixed with the regeneration medium (e.g., any of the regeneration media described herein) for a suitable contact period (for example about 10 min to 24 hours, including about 10 min, about 15 min, about 20 min, about 25 min, about 30 min, about 35 min, about 40 min, about 45 min, about 50 min, about 55 min, about 60 min, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours, including ranges between any of these values) and then removed from contact with the regeneration medium by suitable means (decanting, filtration, etc.).

Removing all or nearly all of the PFAS during the regeneration process provides a regenerated cationic CDP adsorbent with PFAS adsorption properties that are the same or nearly the same as pristine adsorbent-i.e., having high adsorption capacity and rapid adsorption kinetics for PFAS. The speed and efficiency with which the regeneration medium removes adsorbed PFAS is also important. Regeneration media that rapidly remove adsorbed PFAS using relatively small volumes are advantageous in that the recovered PFAS obtained by the regeneration process is present in the spent regeneration medium at a higher concentration.

One way of describing the effectiveness of the regeneration medium in removing PFAS is the number of bed volumes of regeneration medium required to remove all or nearly all PFAS from the cationic CDP adsorbent. The term "bed volume" refers to the empty volume of the entire packed-bed vessel in which the regeneration is performed. To allow for bed expansion during upflow regeneration, the CDP adsorbent is packed in the vessel with sufficient empty space ratio which in various embodiments will be in the range of about 15-60%, including about 15%, about 20%, about 25%, about 30%, about 35%, about 40%, about 45%, about 50%, about 55%, about 60%, or about 65%, including ranges between any of these values. In specific embodiments, the empty space ratio is in the range of about 30-50%. The term "empty space ratio" refers to the volume fraction of empty headspace in the entire vessel after packing the CDP adsorbent. A regeneration medium that can regenerate the adsorbent with fewer "bed volumes" is more effective than another regeneration medium that requires a greater number of bed volumes, under the same conditions, to achieve the same level of PFAS desorption from the adsorbent. In various embodiments, the number of bed volumes will be in the range of about 1-20, including about 1, about 2, about 3, about 4, about 5, about 6, about 7, about 8, about 9, about 10, about 11, about 12, about 13, about 14, about 15, about 16, about 17, about 18, about 19, or about 20, including ranges between any of these values. In specific embodiments, the number of bed volumes is in the range of about 1-10. More effective regeneration media, such as those described herein for desorbing PFAS from the cationic CDP adsorbents disclosed herein, reduce the bed volumes of regeneration medium required to achieve regeneration of the adsorbent, which results in higher concentrations of desorbed PFAS in the spent regeneration medium. Such higher concentrations are beneficial, as it reduces the volume of PFAS-contaminated liquid which must ultimately be treated to isolate and destroy (i.e., mineralize) the PFAS (FIG. 1 and FIG. 2). Higher PFAS concentrations are also beneficial if the PFAS must be further concentrated before destruction.

In addition, more effective regeneration media that can regenerate the cationic CDP adsorbent with fewer bed volumes generally desorb PFAS more rapidly, which shortens the time required for regeneration. This can be very beneficial to the overall PFAS removal process, as it may allow quicker turnaround times for the circulation of regenerated adsorbent for reuse.

After removing the adsorbed PFAS from the CDP adsorbent, using the regeneration methods described herein, the resulting PFAS solution obtained can be further concentrated using methods known in the art, such as membrane filtration, distillation, or evaporation, or combinations of these. These further concentrated solutions can comprise (i) a mixture of the solvents originally present in the regeneration medium, and in the case of a solvent mixture, the ratio of solvents may be the same ratio originally present in the regeneration medium, or may be present in a ratio which differs from the ratio originally present in the regeneration medium, (ii) an aqueous solution provided after substantial removal of the alcohol, or (iii) a solid which is essentially free of solvents. These processes not only provide a more concentrated PFAS solution, but also are advantageous in that the volume of the PFAS recovered is smaller, and thus can be more efficiently destroyed or disposed, and also allows for recovery and reuse of the regeneration solvents.

Recovery or regeneration efficiency is defined as the mass percentage of adsorbed PFAS recovered (i.e., desorbed) from the spent adsorbent after regeneration. Higher recovery efficiency is advantageous, as it increases the number of adsorption/desorption cycles that a given volume of cationic CDP adsorbent can undergo and therefore enables the reuse of adsorbent multiple times. The regeneration media of the present disclosure provide recovery efficiencies of about 50% to about 95% or higher, including about 50%, about 55%, about 60%, about 65%, about 70%, about 75%, about 80%, about 85%, about 90%, about 95%, about 96%, about 97%, about 98%, about 99%, or about 100%, including ranges between any of these values.

All documents referenced herein, including inter alia patents, patent applications, patent publications, and journal references, are incorporated by reference in their entireties for all purposes.

EXAMPLES

Materials

Methanol—Fisher Chemical, HPLC grade; Ethanol—Spectrum, 190 proof, Reagent grade; Isopropanol—Optima, LC/MS grade; Deionized (DI) water—obtained from Milli-Q system; Tap water—obtained from Chicago city water supply; Ammonium acetate ($NH_4OAc$)—Fisher Chemical, Crystalline/HPLC grade; Ammonium hydroxide ($NH_4OH$), 30.0% w/w, Certified ACS Plus grade; Ammonium formate ($NH_4HCO_2$)—Fisher Chemical, LC/MS grade; Calcium chloride ($CaCl_2$)—Acros, Reagent grade; Cesium sulfate ($Cs_2SO_4$)—Alfa Aesar, Reagent grade; Hydrochloric acid (HCl)—Fisher Chemical, 38.0% w/w, Certified ACS Plus grade; Lithium chloride (LiCl)—Sigma Aldrich, ReagentPlus grade; Sodium chloride (NaCl)—Sigma Aldrich, ACS reagent grade; Sodium sulfate ($Na_2SO_4$)—Sigma Aldrich, ACS Reagent grade; Potassium hydroxide (KOH)—Fisher Chemical, flakes, technical grade; Potassium sulfate ($K_2SO_4$)—Sigma Aldrich, BioUltra grade.

Example 1: Regeneration of PFAS-Laden Cationic CDP Adsorbent From DI Water

To assess various salts for DEXSORB+TFN regeneration, 6 mL empty polypropylene solid-phase extraction (SPE) cartridges were loaded with 50 mg of DEXSORB+TFN. The cartridges were cleaned and conditioned by passing 10 mL of methanol amended with 1 mg/ml of either ammonium acetate ($NH_4OAc$), ammonium formate ($NH_4HCO_2$), calcium chloride ($CaCl_2$), or sodium chloride (NaCl) followed by 10 mL of deionized water using light vacuum. A 10-mL sample of deionized water fortified with 1 ppb each of 12 PFAS compounds was then passed through each cartridge at a flow rate of approximately 5 mL/min using light vacuum. The adsorbed PFAS were recovered by passing 10 mL of methanol amended with 1 mg/ml of the various salts listed above through the DEXSORB+TFN bed and collected into 15 mL centrifuge tubes. Aliquots of the eluents were fortified with mass-labelled internal standard and analyzed using an LC-MS/MS (Thermo Scientific Q-Exactive Hybrid Quadrupole-Orbitrap) to determine the amount of PFAS recovered. The overall regeneration efficiencies were in the range of 86-105%, as shown in FIG. 3.

Example 2: Regeneration of PFAS-Laden Cationic CDP Adsorbent From an RO Concentrate of Drinking Water Prior to regeneration, a Rapid Small-Scale Column Test (RSSCT) experiment was performed where 0.3 g (0.72 mL) of DEXSORB+TFN was packed into an HPLC column (Restek, ID=4.6 mm) and 7.63 gallons of PFAS-contaminated reverse osmosis (RO) concentrate with initial total PFAS concentrations of over 3,000 ng/L was passed through the column at a flow rate of 1.38 mL/min. The mass of PFAS on DEXSORB+TFN was calculated by integrating the difference between initial (column inlet) and remaining (column outlet) PFAS concentrations and then multiplying by the total volume of water passed through the column.

Figure 4A:
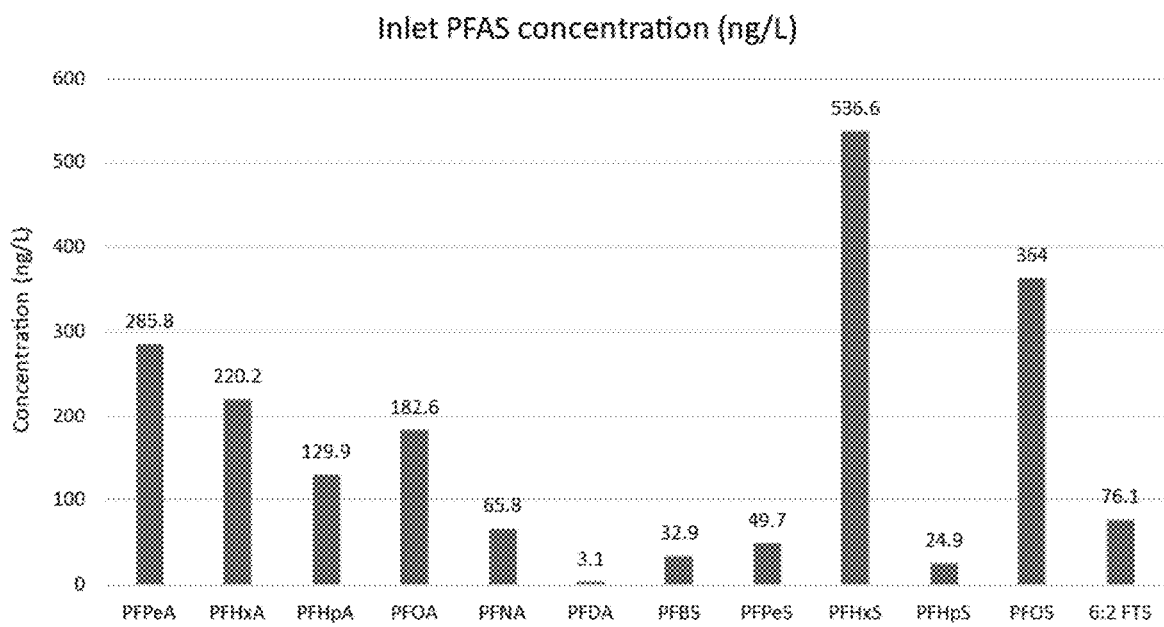
FIG. 4A: Inlet PFAS concentrations for DEXSORB+TFN regenerated with 2:1 (v/v) ethanol:water mixture containing 0.5 g/L of $K_2SO_4$.
Figure 4B:
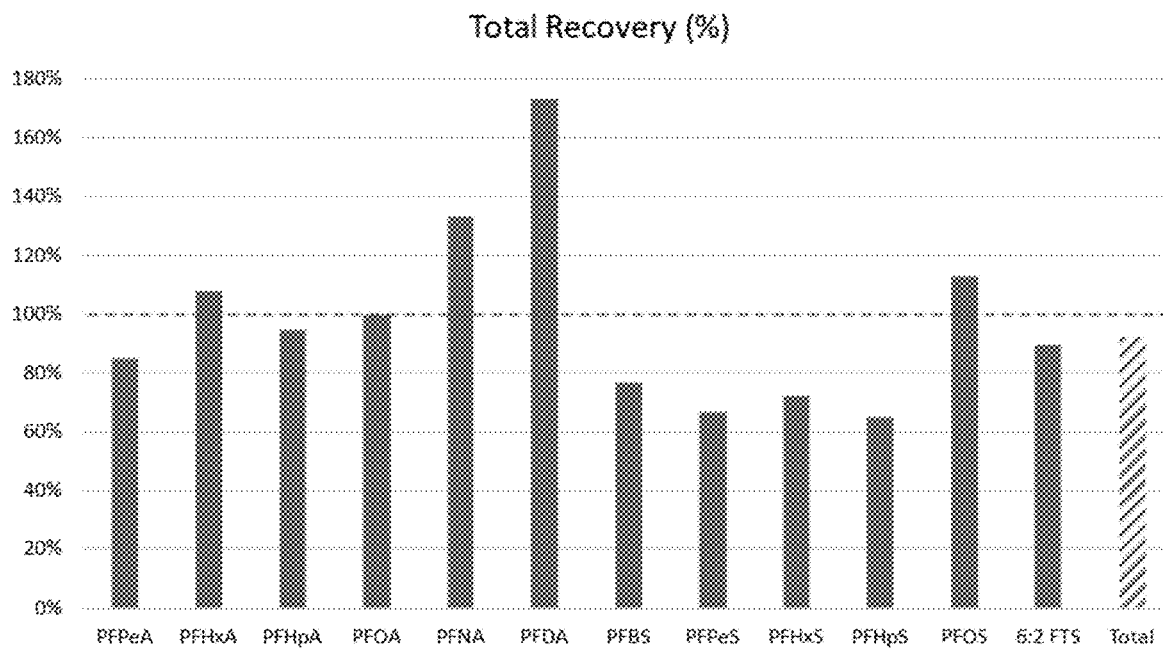
FIG. 4B: Percent total recovery of various PFAS compounds for DEXSORB+TFN regenerated with 2:1 (v/v) ethanol:water mixture containing 0.5 g/L of $K_2SO_4$.

The regeneration experiment was subsequently conducted using the same DEXSORB+TFN column from the RSSCT experiment. The regeneration medium was 2:1 (v/v) ethanol: water mixture amended with 0.5 g/L of $K_2SO_4$, resulting in a saturated solution. Under ambient temperature (~20° C.) and pressure (~1 bar), a total of 73 mL of the regeneration medium was passed through the DEXSORB+TFN column at a flow rate of 0.5 mL/min with several circulation cycles to maximize the use of the regeneration medium. Based on the volume of regeneration medium and PFAS concentrations, the mass of PFAS recovered from PFAS-loaded DEXSORB+TFN was calculated. Mass balance model was established based on the PFAS adsorption during RSSCT and PFAS desorption during regeneration. The regeneration efficiency for the combination of all PFAS in solution was 92%, as shown in FIG. 4.

Examples 3-9: Regeneration of PFAS-Laden Cationic CDP Adsorbent From an RO Concentrate of Surface Water Materials The spent DEXSORB+TFN adsorbent used in this set of examples was obtained from a field pilot column that treated surface water RO concentrate with a total PFAS concentration of about 350 ng/L. Over 200,000 gallons of RO concentrate were passed through the column over the course of 9 months. The major PFAS species in this RO concentrate influent were PFOS, PFOA, PFHxS, and PFBS. Upon completion of the pilot test, the DEXSORB+TFN adsorbent was removed from the column, allowed to dry in air, and used for further regeneration experiments. The regeneration efficiency of spent DEXSORB+TFN adsorbent was evaluated in both batch and column experiments.

Batch Regeneration Procedure

PFAS-laden, spent DEXSORB+TFN was sampled from a large container into a 1 L high-density polyethylene (HDPE) bottle. The sampled adsorbent in the bottle was mixed thoroughly before use in both batch and column regeneration experiments. For batch experiments, 50 mL polypropylene (PP) conical centrifuge tubes were weighed, and 10 mL of spent DEXSORB+TFN was added, followed by the addition of 20 mL of regeneration medium. The centrifuge tubes were tumbled in a rotary tumbler at 40 rpm for two hours under ambient temperature. After two hours, the tubes were centrifuged at 4,800 rpm for 10 minutes. 5 mL of the supernatant from each tube was decanted into plastic scintillation vials. The rest of the supernatant was discarded as waste. This process was repeated for a total of five cycles. After completion of all five cycles, the tubes were dried overnight at 60° C. under a stream of hot air and then under vacuum. The final dry mass of the regenerated adsorbent was recorded. PFAS concentrations in the spent regeneration media were measured and analyzed following the methods outlined in Examples 1 and 2, respectively. All experiments were performed in duplicate.

Column Regeneration Procedure

Column tests were performed using a liquid chromatography column consisting of a borosilicate glass barrel and PEEK endpieces. The columns were set up in parallel on two ring stands with clamps. Each column was prepared by capping and sealing the column bottom, then filling the column with loosely packed glass wool, and finally adding spent DEXSORB+TFN adsorbent up to a height of 30 cm, corresponding to roughly 70 g of wet adsorbent. After allowing the column to settle and topping it off with water, the final height of the packed adsorbent was recorded. A felt filter was placed near the top of the column to prevent particle loss during backwash. Finally, the column was capped, and outlet nozzles were attached. 300 mL of the regeneration medium tested was poured into a 500 mL HDPE bottle. The bottle lid was outfitted with two drilled holes to hold tubing, and both the inlet and outlet tubing (Masterflex L/S High-Performance Precision Tubing, L15) were inserted through the lid and attached to the inlet and outlet of the column. The inlet tubing was then locked in place in the head of a Masterflex L/S Standard Digital Drive Pump. The drive was set to upflow mode, and the pump line was primed until the regeneration medium reached near the column, with the flow rate set to 20 mL/min. The design parameters are summarized in Table 1.

TABLE 1

| Design Element | Parameter |
| --- | --- |
| Column length | 50 cm |
| Column inner diameter | 2.5 cm |
| Flow rate | 20 mL/min |
| Packed adsorbent height | 30 cm |
| Packed adsorbent volume | 147.3 mL |
| Bed volume | 245.4 mL |
| Duration | 120 min |

During the first regeneration cycle, a careful observation of the bed expansion was made to prevent contact between the top of the adsorbent bed and the outlet filter. A bed expansion rate of 20-30% was consistently observed with the upflow backwash of DEXSORB+TFN granules. Any visible large air bubbles (>3 mm in diameter) in the column were gently tapped with a rubber mallet until dissipated. Circulation was halted after two hours of backwash. The outlet tubing from the top of the column was slightly raised in the HDPE bottle until it was no longer submerged, and the drive was set to downflow mode. Downflow circulation was initiated at the same flow rate (20 mL/min) to purge the regeneration medium off the column. Upon completion, the pump was stopped, and the 500 mL HDPE bottle was exchanged with a new one containing 300 mL of fresh regeneration medium. Backwashing of the adsorbent in the same column was repeated until five regeneration cycles had been completed for a total regeneration medium volume of 1500 mL, corresponding to a total of 6.1 bed volumes.

Procedure for Determining PFAS Loading in Spent Adsorbent

A PFAS extraction method was developed in order to determine the identities and amounts of PFAS adsorbed on the spent adsorbent and calculate PFAS recovery rates in the regeneration cycles. A 25 mL sample of spent DEXSORB+TFN granules was oven dried overnight at 60° C. under a stream of hot air and then pulverized in a grinder. 2.0 (±0.05) g of dried adsorbent were added to a 50 mL PP conical centrifuge tube. These samples were prepared in duplicate. An elution solution of methanol amended with 10 g/L of NH$_4$OAc was then prepared, and PFAS was extracted following the same protocol described above under batch regeneration procedure. The supernatant solutions were collected, diluted, and analyzed via LC-MS/MS following the procedure outlined in Example 1.

Example 3

Figure 5:
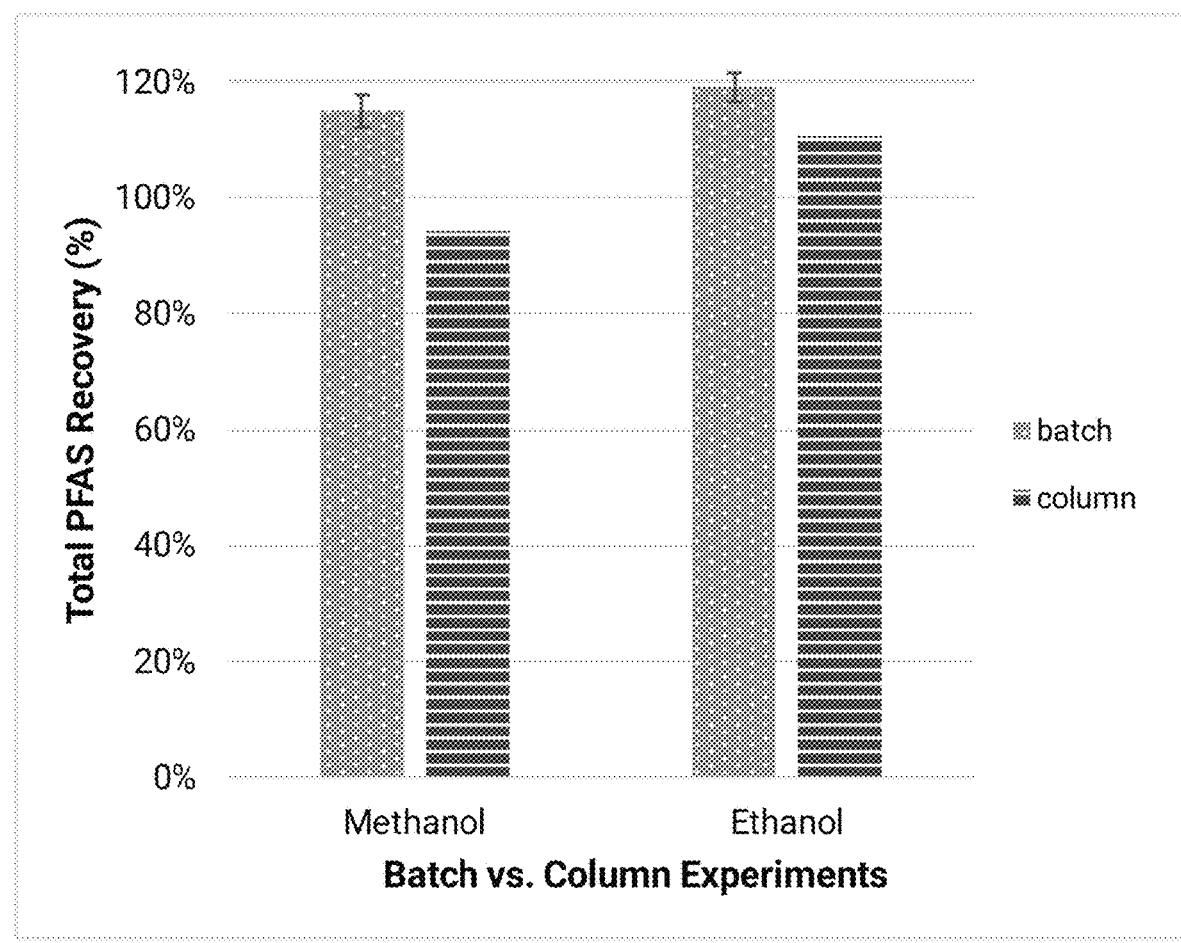
FIG. 5: Total PFAS recovery from batch and column regeneration experiments with methanol and ethanol amended with 2 g/L of $NH_4OAc$.

The data in FIG. 5 compare the regeneration efficiencies under batch and column tests using methanol and ethanol amended with 2 g/L of NH$_4$OAc as regeneration media following the procedures described above. Both regeneration media showed high total PFAS recovery (>94% by mass) from the spent adsorbent. These results indicate that chemical regeneration of spent DEXSORB+TFN is effective under both batch and column operations and that batch experiments can be used as a suitable proxy for column regeneration performance.

Example 4

Figure 6:
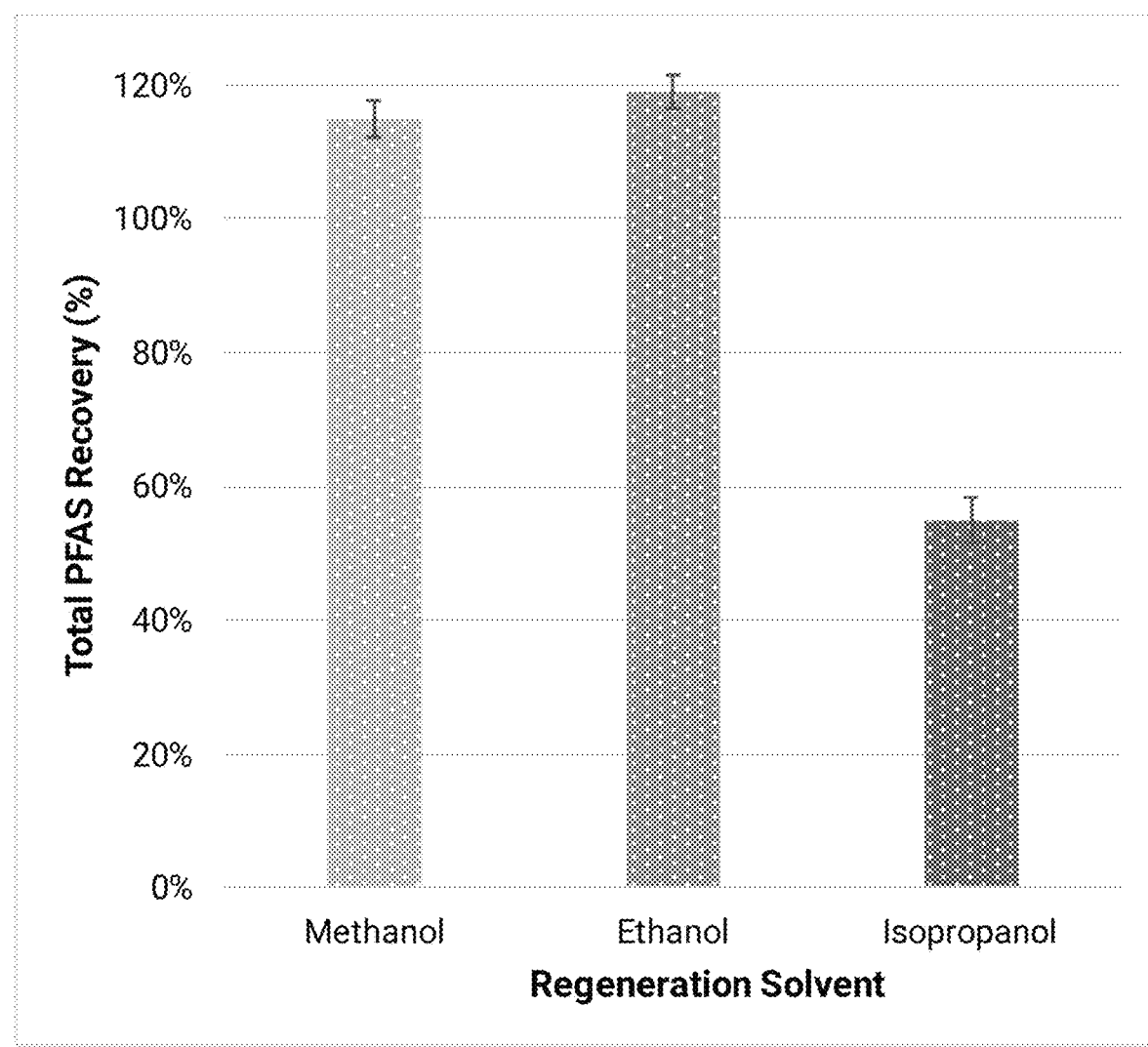
FIG. 6: Comparison of total PFAS recovery from batch regeneration experiments between methanol, ethanol, and isopropanol, each amended with 2 g/L of $NH_4OAc$.

Batch regeneration experiments were conducted to compare the regeneration efficiency of alcohol solvents including methanol, ethanol, and isopropanol. The regeneration media were prepared by amending each solvent with 2 g/L of NH$_4$OAc. The results shown in FIG. 6 demonstrate that both regeneration media containing methanol and ethanol outperformed that of isopropanol. For large-scale operations, ethanol would be a particularly useful regeneration solvent in comparison to the more hazardous nature of methanol for safety and handling.

Example 5

Figure 7:
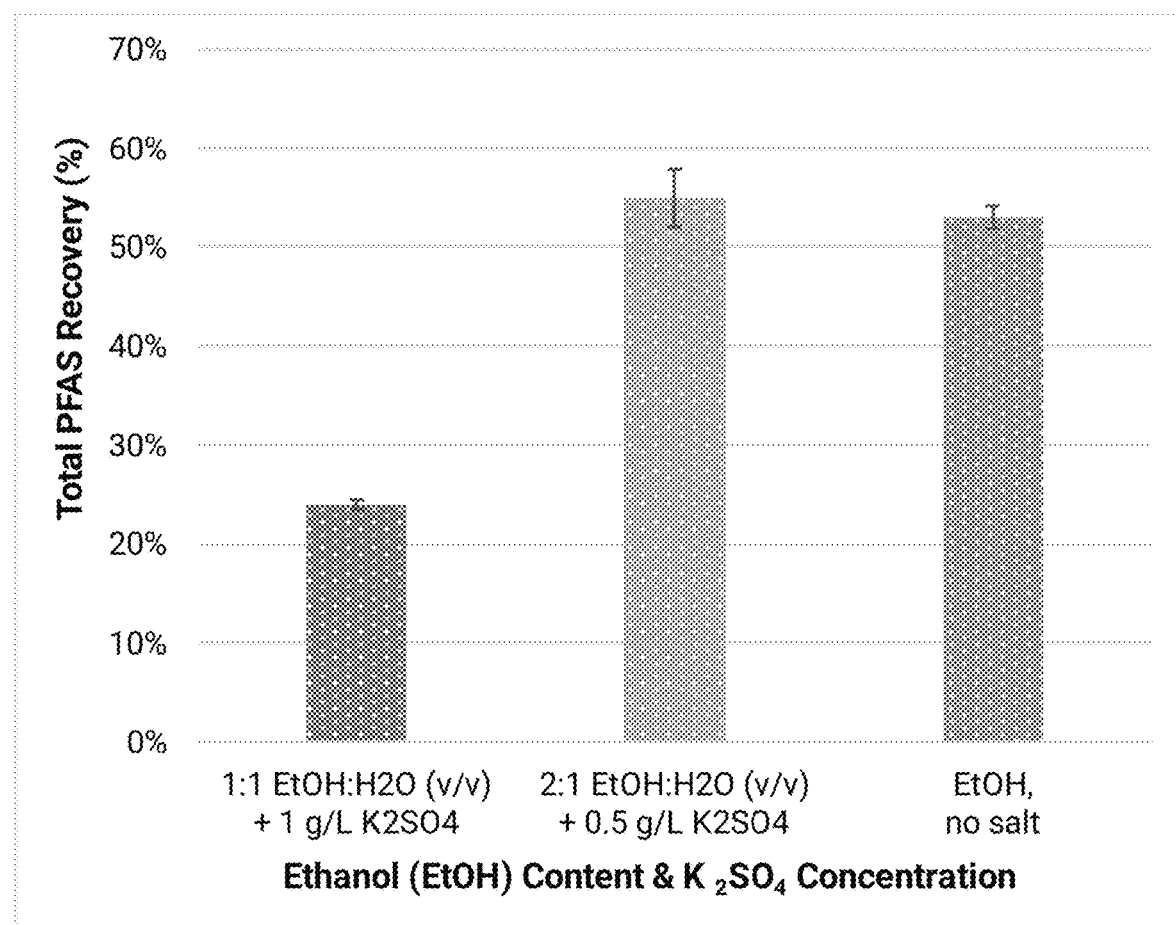
FIG. 7: Comparison of total PFAS recovery from batch regeneration experiments between regeneration media of ethanol (190 proof, no salt added), 2:1 (v/v) ethanol:water mixture (corresponding to 63% ethanol by volume) amended with 0.5 g/L of $K_2SO_4$, and 1:1 (v/v) ethanol:water mixture (corresponding to 48% ethanol by volume) amended with 1 g/L of $K_2SO_4$.

These experiments were performed following batch regeneration procedure to evaluate the impact of ethanol content and salt concentration of the regeneration medium on regeneration efficiency. Three regeneration media were tested: (1) ethanol with no salt added, (2) 2:1 (v/v) ethanol:water mixture amended with 0.5 g/L of $K_2SO_4$, corresponding to 63% ethanol by volume, and (3) 1:1 (v/v) ethanol:water mixture amended with 1 g/L of $K_2SO_4$, corresponding to 48% ethanol by volume. The concentration of $K_2SO_4$ was observed to be near its saturation limit in both solutions. $K_2SO_4$ is insoluble in ethanol. As shown in FIG. 7, ethanol alone was found to be more effective at desorbing PFAS than 1:1 (v/v) ethanol:water mixture amended with 1 g/L of $K_2SO_4$ (total PFAS recovery of 53±1% vs. 24±1%) and was equally effective compared to 2:1 (v/v) ethanol:water mixture amended with 0.5 g/L of $K_2SO_4$ (total PFAS recovery of 53±1% vs. 55±3%). These results indicate that certain amount of ethanol in the regeneration medium is critical to obtain high regeneration efficiencies and also hint that adsorption mechanisms based on hydrophobic interactions play a significant role in PFAS adsorption in DEXSORB+TFN.

Example 6

Figure 8:
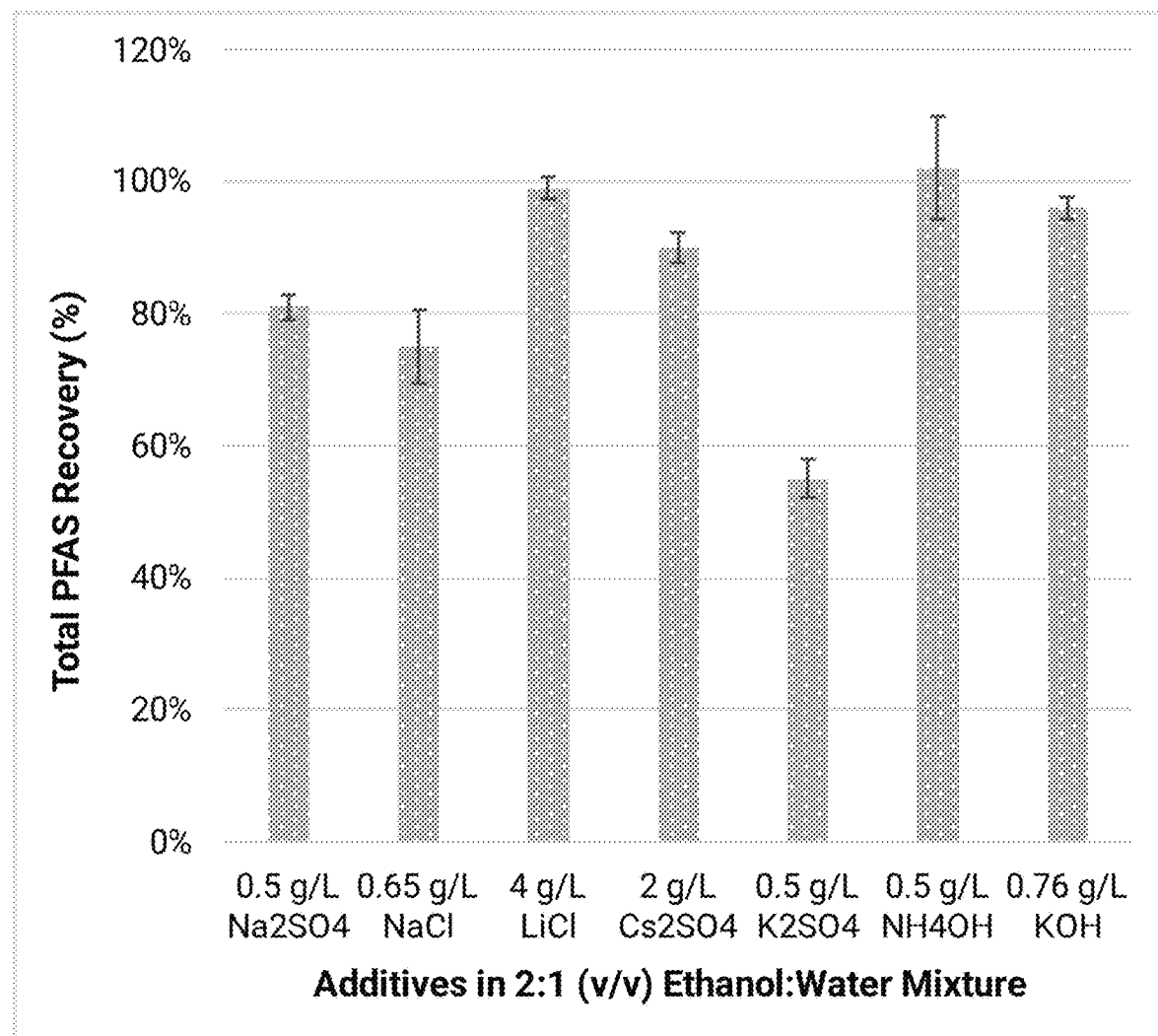
FIG. 8: Evaluation of other salt, acid, and base additives in 2:1 (v/v) ethanol:water mixture and comparison of total PFAS recovery from batch regeneration experiments.

Additional salts and bases were evaluated for PFAS recovery efficiency using 2:1 (v/v) ethanol:water mixture as the regeneration solvent. The following salts were screened: $Na_2SO_4$ (0.5 g/L), NaCl (0.65 g/L), LiCl (4 g/L), and $Cs_2SO_4$ (2 g/L). The concentration of all salts except LiCl were near the saturation limit. LiCl is highly soluble in ethanol. The screened bases were $NH_4OH$ (0.5 g/L) and KOH (0.76 g/L) with adjusted concentrations such that molar amount of hydroxide ions were same between the two solutions. All regeneration media were tested following the batch regeneration procedure. The results are summarized in FIG. 8. Regeneration with both $NH_4OH$ and KOH solutions showed high efficiencies (102% and 96%, respectively). The regeneration medium with LiCl at high salt concentration also exhibited near quantitative regeneration efficiency (99%).

Example 7

Figure 9:
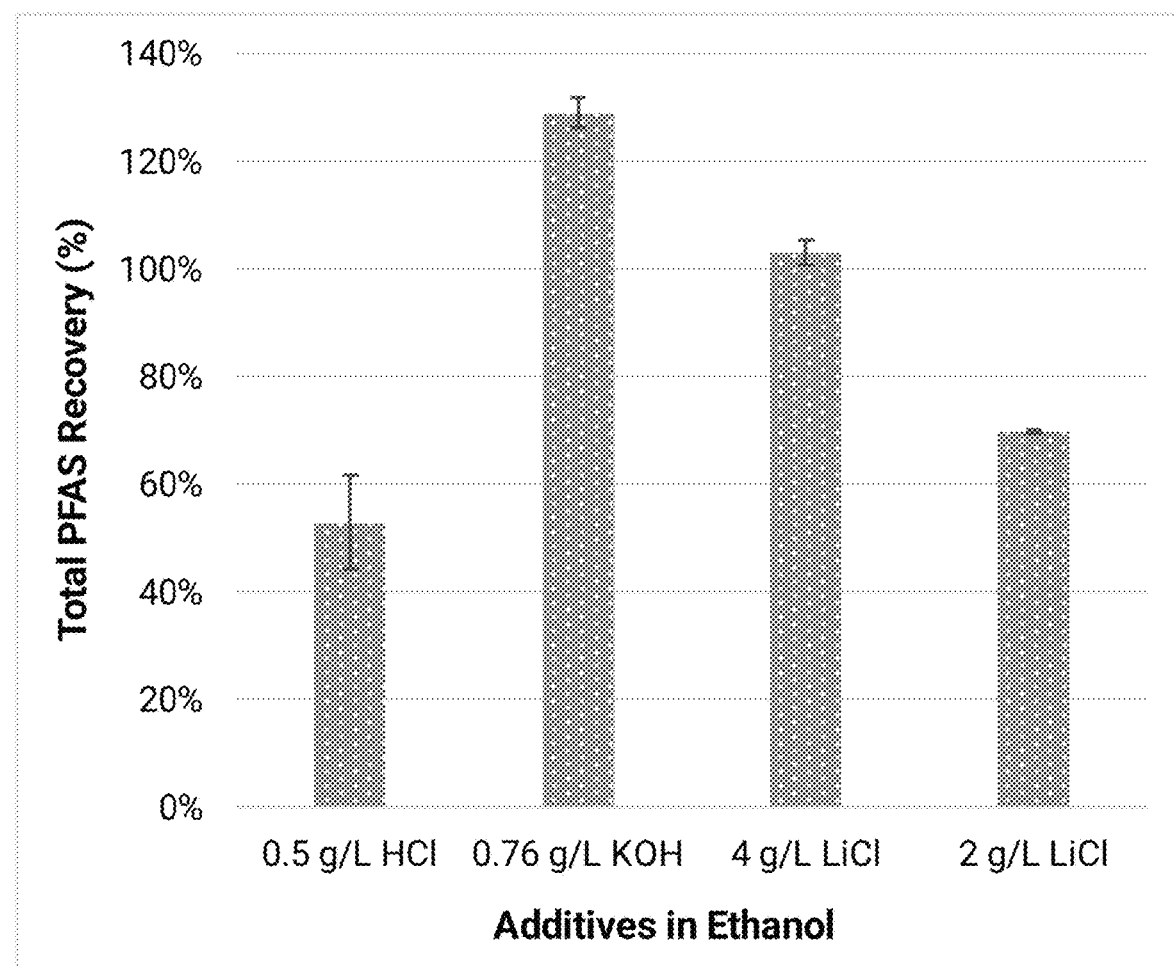
FIG. 9: Evaluation of other salt, acid, and base additives in ethanol and comparison of total PFAS recovery from batch regeneration experiments.

The following additives were evaluated for PFAS recovery efficiency using ethanol only as the regeneration solvent: HCl (0.5 g/L), LiCl (2 g/L and 4 g/L), and KOH (0.76 g/L). The concentration of HCl was chosen such that its molar concentration is equal to that of KOH. All regeneration media were tested following the batch regeneration procedure. The results are summarized in FIG. 9. The ethanol with HCl (0.5 g/L) displayed a lower PFAS recovery performance compared to the other solutions. The recovery efficiency also decreased when the concentration of LiCl was lowered from 4 g/L to 2 g/L in ethanol. The LiCl concentration of 4 g/L appeared equally effective in both 2:1 (v/v) ethanol:water mixture and ethanol.

Example 8

Figure 10:
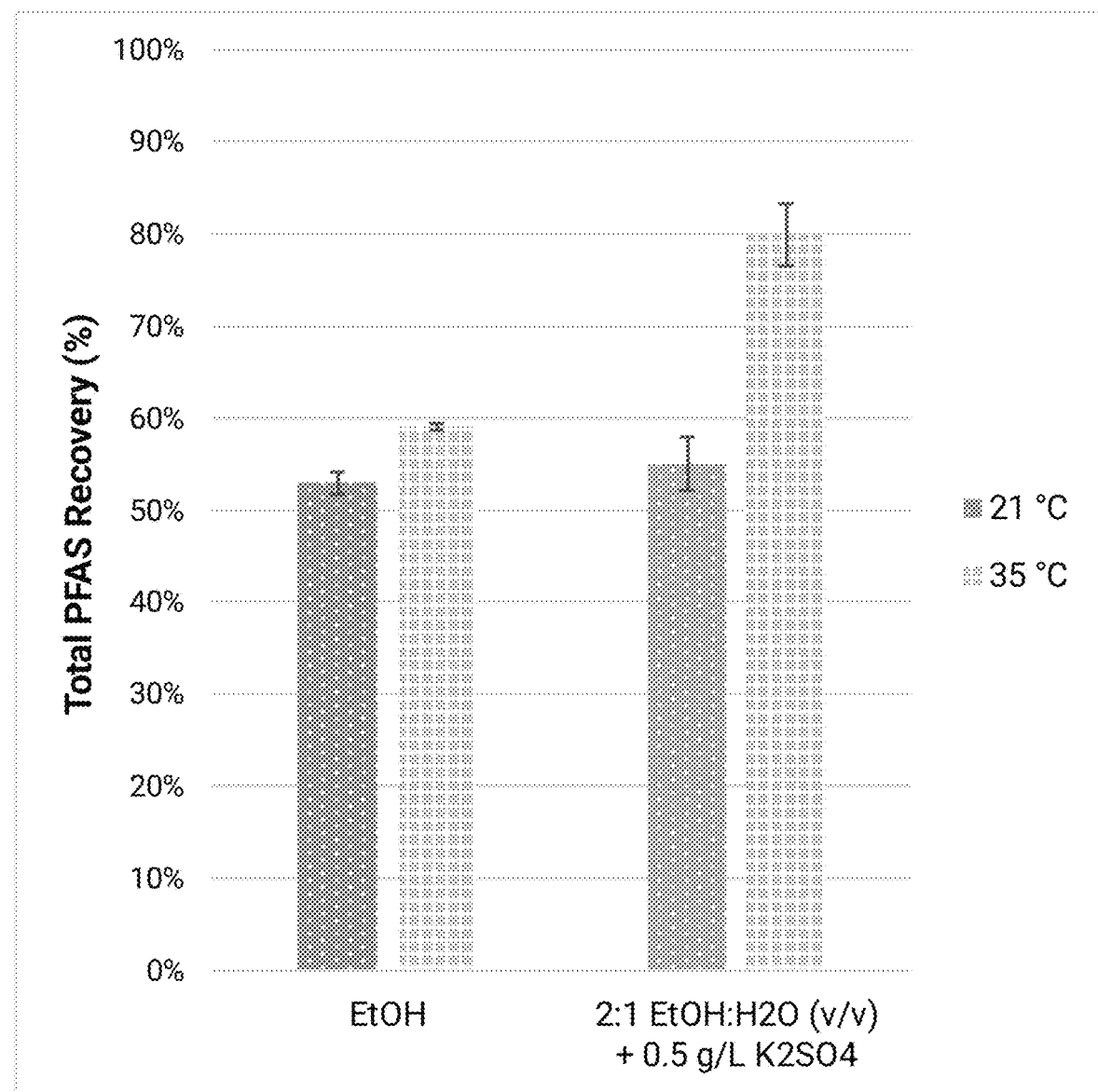
FIG. 10: Comparison of total PFAS recovery at 21° C. and 35° C. in ethanol and 2:1 (v/v) ethanol:water mixture amended with 0.5 g/L of $K_2SO_4$ from batch regeneration experiments.

The influence of temperature on regeneration efficiency was evaluated using two different regeneration media:ethanol with no salt and 2:1 (v/v) ethanol:water mixture amended with 0.5 g/L of $K_2SO_4$. Two sets of batch experiments were conducted where the first set of samples were tumbled using a benchtop tumbler at ambient temperature (21° C.) and the second set of samples were tumbled in an incubated tumbler set to 40° C. The incubated samples consistently reached a uniform internal temperature of 35° C. All experiments followed the batch regeneration procedure. The temperature increase in both regeneration media resulted in an increase in the total PFAS recovery as expected due to more favorable desorption conditions at higher temperatures (FIG. 10). The net increase in recovery efficiency in the case of 2:1 (v/v) ethanol:water mixture amended with 0.5 g/L of $K_2SO_4$ was found to be larger than that in ethanol with no salt.

Example 9

An experiment was designed to test the concentration of spent regeneration medium to demonstrate the feasibility of recycling the regeneration solvents and minimizing the amount of PFAS-containing waste for subsequent disposal or processing. This concentration process can be adjusted to afford either a liquid waste with high PFAS concentration after partial removal of solvents or a PFAS-laden solid waste after complete removal of solvents. The concentration step can be achieved through membrane filtration, distillation, or evaporation, or combinations of these.

A simple distillation setup consisting of a heat plate and crucible, 1 L round-bottom boiling flask, a distillation head coupled with a condensation column (110 mm condenser length), and 500 mL round-bottom collection flask was used. The distillation was performed under slight vacuum. A spent regeneration medium was generated from spent DEXSORB+TFN following the column regeneration procedure involving five regeneration cycles with 2:1 (v/v) ethanol:water mixture amended with 0.5 g/L of $K_2SO_4$. A 300 mL aliquot from this spent regeneration medium was subjected to distillation. After heating at 70° C. for less than 3 hours under slight vacuum, approximately 185 mL of distillate was collected, suggesting that almost all ethanol in the solution was removed. This concentration process resulted in an aqueous solution that was about 2.6 times more concentrated in PFAS than the original spent regeneration medium.

To isolate the PFAS in solid form, the distillation was further continued at elevated temperatures (100° C.) under vacuum. The remaining portion of the spent regeneration medium (115 mL) was collected as distillate and a solid mixture containing PFAS was obtained in the boiling flask. This process was repeated for the remaining four treatment cycles (4×300 mL) until complete distillation was achieved, resulting in a total of about 0.78 g of solids. $K_2SO_4$ was estimated to constitute the majority of the solid mixture (about 0.75 g). The solid mixture was reconstituted in methanol and analyzed for PFAS, which revealed a total of about 1 mg of PFAS.

The invention claimed is:
1. A method of removing poly-and per-fluoroalkyl substances (PFAS) from a cationic crosslinked cyclodextrin polymer (CDP) adsorbent having adsorbed PFAS, comprising:
 contacting a volume of the cationic CDP adsorbent with
  a regeneration medium comprising:
   ethanol and water at a volumetric ratio ranging from
    about 1:1 to about 2:1, and an alkali sulfate salt, an alkaline earth sulfate salt, or an ammonium sulfate salt; and separating the cationic CDP adsorbent from the regeneration medium, whereby at least about 50% of the total adsorbed PFAS is removed from the cationic CDP adsorbent into the regeneration medium; and wherein the cationic CDP adsorbent is prepared by polymerizing β-cyclodextrin and a compound bearing a cationic functional group with tetrafluoroterephthalonitrile.

2. The method of claim 1, wherein the alkali sulfate salt is $Na_2SO_4$ or $K_2SO_4$.

3. The method of claim 2, wherein the alkali sulfate salt is $Na_2SO_4$.

4. The method of claim 2, wherein the alkali sulfate salt is $K_2SO_4$.

5. The method of claim 1, wherein said contacting is carried out at a temperature ranging from about 20° C. to about 40° C.

6. The method of claim 2, wherein said contacting is carried out at a temperature ranging from about 20° C. to about 40° C.

7. The method of claim 1, wherein the adsorbed PFAS are selected from the group consisting of perfluorooctanoic acid, perfluorooctane sulfonic acid, perfluorobutane sulfonic acid, hexafluoropropylene oxide dimer acid, perfluorononanoic acid, perfluorohexane sulfonic acid, perfluorodecanoic acid, perfluorohexanoic acid, perfluorobutanoic acid, and combinations thereof.

8. The method of claim 2, wherein the adsorbed PFAS are selected from the group consisting of perfluorooctanoic acid, perfluorooctane sulfonic acid, perfluorobutane sulfonic acid, hexafluoropropylene oxide dimer acid, perfluorononanoic acid, perfluorohexane sulfonic acid, perfluorodecanoic acid, perfluorohexanoic acid, perfluorobutanoic acid, and combinations thereof.

9. The method of claim 1, wherein the cationic CDP adsorbent is contained in a packed-bed vessel, and the regeneration medium flows from the bottom to the top of the packed-bed vessel.

10. The method of claim 2, wherein the cationic CDP adsorbent is contained in a packed-bed vessel, and the regeneration medium flows from the bottom to the top of the packed-bed vessel.

11. The method of claim 6, wherein the cationic CDP adsorbent is contained in a packed-bed vessel, and the regeneration medium flows from the bottom to the top of the packed-bed vessel.

12. The method of claim 9, wherein the regeneration medium has a flow rate at which the bed expansion rate ranges from about 30% to about 50%.

13. The method of claim 10, wherein the regeneration medium has a flow rate at which the bed expansion rate ranges from about 30% to about 50%.

14. The method of claim 11, wherein the regeneration medium has a flow rate at which the bed expansion rate ranges from about 30% to about 50%.

15. The method of claim 1, wherein the PFAS removed from the cationic CDP adsorbent is further concentrated using a method selected from the group consisting of membrane filtration, distillation, evaporation, and combinations thereof.

16. The method of claim 1, wherein the sulfate salt is present in the regeneration medium at a concentration from about 0.2 g/L to about 0.5 g/L.

17. The method of claim 3, wherein the $Na_2SO_4$ is present in the regeneration medium at a concentration from about 0.2 g/L to about 0.5 g/L.

18. The method of claim 4, wherein the $K_2SO_4$ is present in the regeneration medium at a concentration from about 0.2 g/L to about 0.5 g/L.

19. A method of removing PFAS from a cationic CDP adsorbent having adsorbed PFAS, comprising:

contacting a volume of the cationic CDP adsorbent with a regeneration medium comprising:
ethanol and water at a volumetric ratio ranging from about 1:1 to about 2:1, and
$Na_2SO_4$ which is present at a concentration of about 0.5 g/L; and separating the cationic CDP adsorbent from the regeneration medium, whereby at least about 50% of the total adsorbed PFAS is removed from the cationic CDP adsorbent into the regeneration medium; and wherein the cationic CDP adsorbent is prepared by polymerizing β-cyclodextrin and a compound bearing a cationic functional group with tetrafluoroterephthalonitrile.

20. A method of removing PFAS from a cationic CDP adsorbent having adsorbed PFAS, comprising:

contacting a volume of the cationic CDP adsorbent with a regeneration medium comprising:
ethanol and water at a volumetric ratio ranging from about 1:1 to about 2:1, and
$K_2SO_4$ which is present at a concentration of about 0.5 g/L; and separating the cationic CDP adsorbent from the regeneration medium, whereby at least about 50% of the total adsorbed PFAS is removed from the cationic CDP adsorbent into the regeneration medium; and wherein the cationic CDP adsorbent is prepared by polymerizing β-cyclodextrin and a compound bearing a cationic functional group with tetrafluoroterephthalonitrile.

* * * * *